(12) United States Patent
Otomitsu et al.

(10) Patent No.: US 11,275,218 B2
(45) Date of Patent: Mar. 15, 2022

(54) OPTICAL CONNECTOR AND METHOD FOR CONNECTING OPTICAL CONNECTOR

(71) Applicant: FUJIKURA LTD., Tokyo (JP)

(72) Inventors: Takahito Otomitsu, Sakura (JP); Shuhei Kanno, Sakura (JP); Shunsuke Fujita, Sakura (JP); Kunihiko Fujiwara, Sakura (JP)

(73) Assignee: FUJIKURA LTD., Tokyo (JP)

( * ) Notice: Subject to any disclaimer, the term of this patent is extended or adjusted under 35 U.S.C. 154(b) by 177 days.

(21) Appl. No.: 16/761,637

(22) PCT Filed: Nov. 9, 2018

(86) PCT No.: PCT/JP2018/041586
§ 371 (c)(1),
(2) Date: May 5, 2020

(87) PCT Pub. No.: WO2019/107110
PCT Pub. Date: Jun. 6, 2019

(65) Prior Publication Data
US 2021/0173154 A1 Jun. 10, 2021

(30) Foreign Application Priority Data
Dec. 1, 2017 (JP) .............................. JP2017-232025

(51) Int. Cl.
*G02B 6/38* (2006.01)

(52) U.S. Cl.
CPC ......... *G02B 6/3869* (2013.01); *G02B 6/3822* (2013.01); *G02B 6/3882* (2013.01); *G02B 6/3885* (2013.01)

(58) Field of Classification Search
CPC .. G02B 6/3822; G02B 6/3869; G02B 6/3882; G02B 6/3885
USPC .......................................................... 385/78
See application file for complete search history.

(56) References Cited

U.S. PATENT DOCUMENTS

| | | | |
|---|---|---|---|
| 2012/0201494 A1 | 8/2012 | Suzuki | |
| 2012/0321252 A1* | 12/2012 | Koreeda | G02B 6/3882 385/59 |
| 2018/0306984 A1* | 10/2018 | Otomitsu | G02B 6/40 |

FOREIGN PATENT DOCUMENTS

| | | | |
|---|---|---|---|
| CN | 102385113 A | 3/2012 | |
| GN | 102308237 A | 1/2012 | |
| GN | 102346279 A | 2/2012 | |
| GN | 102830465 A | 12/2012 | |
| JP | H10186174 A | 7/1998 | |
| JP | 2003177278 A | 6/2003 | |

(Continued)

Primary Examiner — Michael P Mooney
(74) Attorney, Agent, or Firm — Osha Bergman Watanabe & Burton LLP

(57) ABSTRACT

An optical connector includes: a ferrule including a guide pin hole, a plurality of fiber holes lined up in a width direction of the optical fiber, and an inclined end face; a housing in which the ferrule is retractably housed; and an application part that applies an upward force to the ferrule in an upward/downward direction when the optical connector connects with a counterpart connector in a connecting/disconnecting direction. The upward/downward direction is a height direction of the optical connector and is orthogonal to both the connecting/disconnecting direction and the width direction. The inclined end face projects upward toward the counterpart connector.

18 Claims, 16 Drawing Sheets

(56) References Cited

FOREIGN PATENT DOCUMENTS

| | | | |
|---|---|---|---|
| JP | 2005181832 | A | 7/2005 |
| JP | 2012163922 | A | 8/2012 |
| JP | 2013003294 | A | 1/2013 |

* cited by examiner

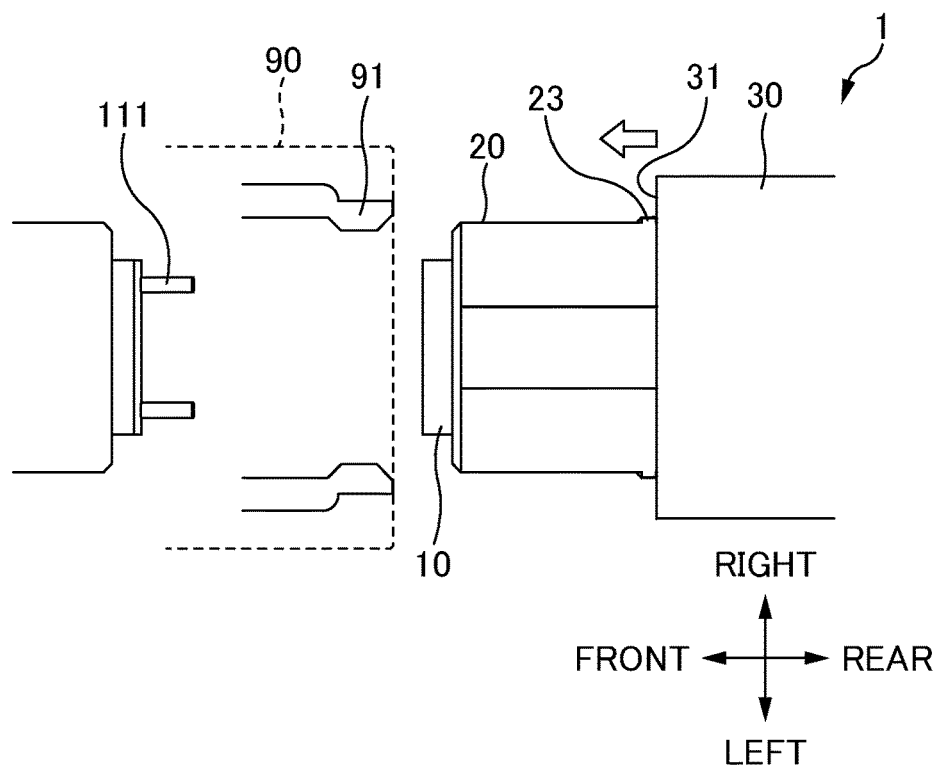
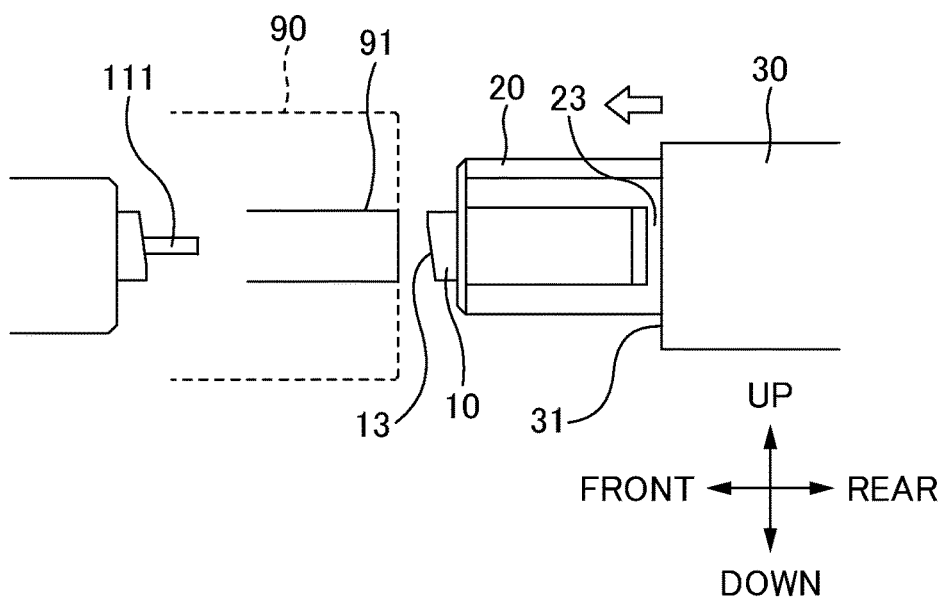
FIG. 4A

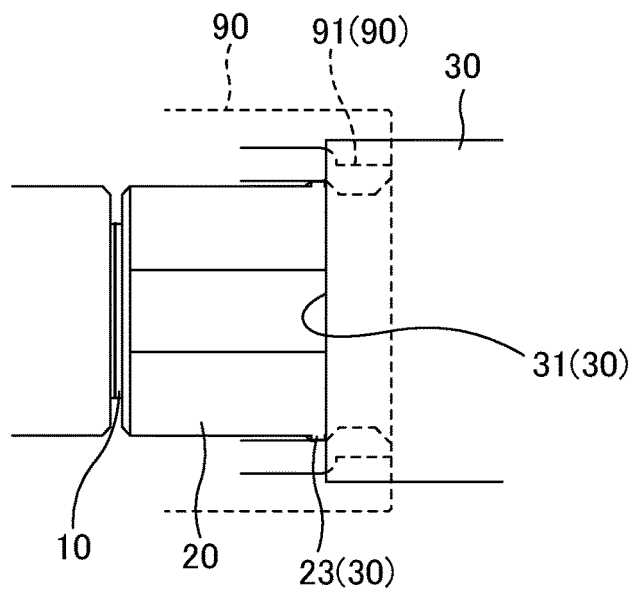
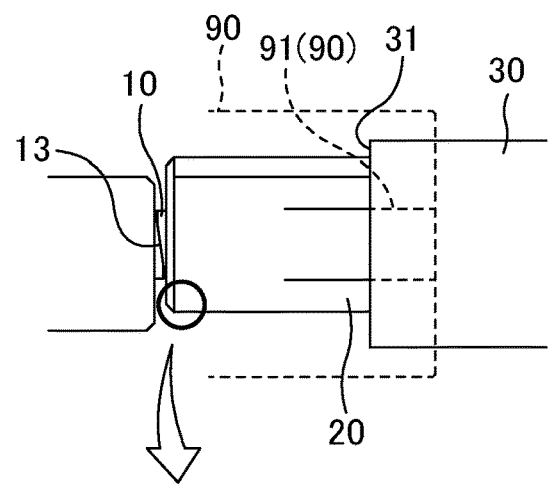
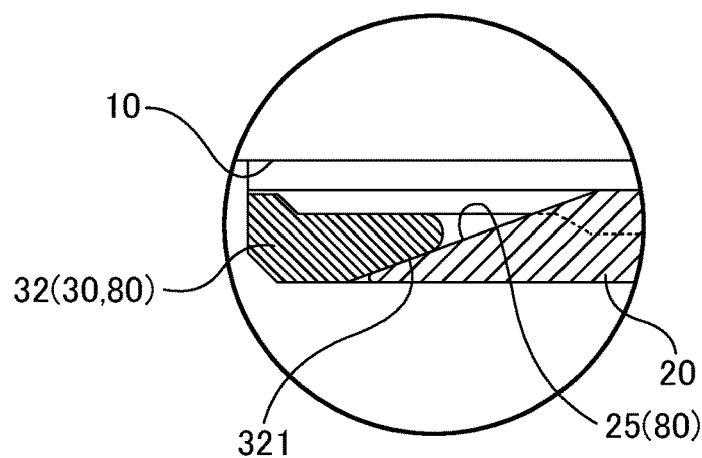
FIG. 4D

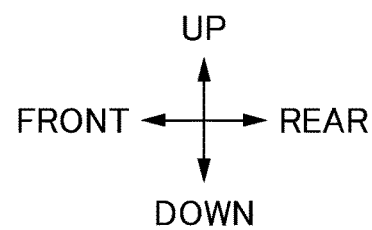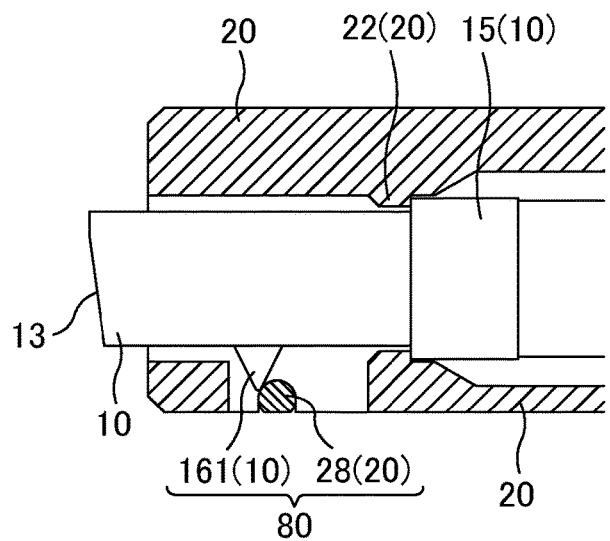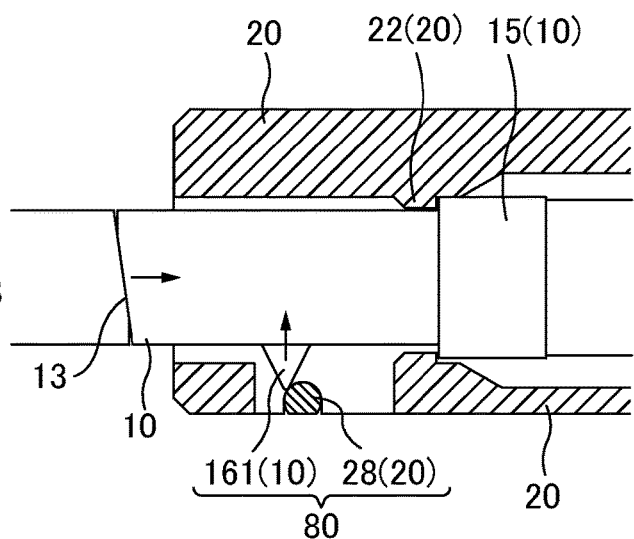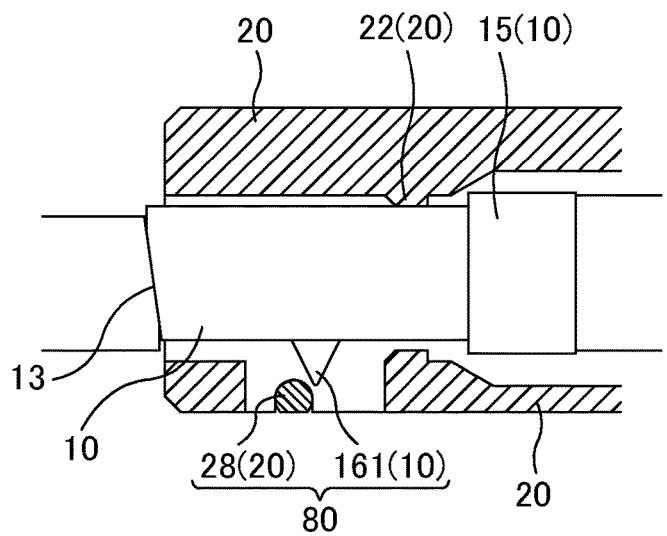

OPTICAL CONNECTOR AND METHOD FOR CONNECTING OPTICAL CONNECTOR

TECHNICAL FIELD

The present invention relates to an optical connector and a method for connecting an optical connector.

BACKGROUND

A known example of an optical connector is an MPO connector (F13-type multi-fiber optical connector compliant with JIS C5982). In this type of MPO connector, the connecting end face of a ferrule is polished in an oblique manner. Patent Literature 1 describes that, when respective connecting end faces of such obliquely-polished ferrules are butted against one another, axial misalignment occurs between optical fibers as a result of the ferrules getting vertically displaced due to the clearance between each ferrule's guide pin hole and a positioning guide pin. In order to suppress an increase in optical loss caused by such axial misalignment between optical fibers (i.e., positional misalignment between optical fiber cores), Patent Literature 1 describes setting the position, in the up/down (vertical) direction, of optical fiber holes at a position slightly deviated from the guide pin hole's central axis by anticipating beforehand the amount of vertical displacement that the ferrules undergo.

At the time of butting the respective connecting end faces of obliquely-polished ferrules against one another, friction force between the connecting end faces may inhibit the ferrules from getting vertically displaced by the previously anticipated amount. However, the optical fiber holes of the aforementioned ferrule are provided at a position that takes into account beforehand the amount of vertical displacement of the ferrule; thus, if the ferrules do not get vertically displaced by the previously anticipated amount, connection loss between optical fibers will increase. Also, if the amount of vertical displacement of the ferrules varies every time the optical connector is connected/disconnected, variations will occur in the connection loss between optical fibers, thereby making it difficult to stably achieve low loss.

One or more embodiments of the present invention stably achieve low loss.

PATENT LITERATURE

Patent Literature 1: JP 2005-181832A

SUMMARY

An optical connector according to one or more embodiments of the present invention includes: a ferrule including a guide pin hole, a plurality of fiber holes lined up in a width direction, and an inclined end face; a housing that houses the ferrule in a recedably (i.e., retractably) pressed manner; and an application part that is configured to apply an upward force to the ferrule when connecting the optical connector with a counterpart connector, wherein a direction that is orthogonal to a connector connecting/disconnecting direction (or simply "connecting/disconnecting direction") and to the width direction is defined as "up/down direction" (or "upward/downward direction"), and a side of the inclined end face that projects toward the counterpart connector is defined as "up" (i.e., the inclined end face projects upward toward the counterpart connector).

Other features of the present invention are disclosed in the following description and accompanying drawings.

The present invention can stably achieve low loss.

BRIEF DESCRIPTION OF THE DRAWINGS

FIG. 4A is a first explanatory diagram illustrating how the connector is connected in one or more embodiments.

FIG. 4D is a fourth explanatory diagram illustrating how the connector is connected in one or more embodiments.

FIGS. 10A to 10C are explanatory diagrams illustrating how the connector is connected in one or more embodiments.

DETAILED DESCRIPTION

Figure 1A:
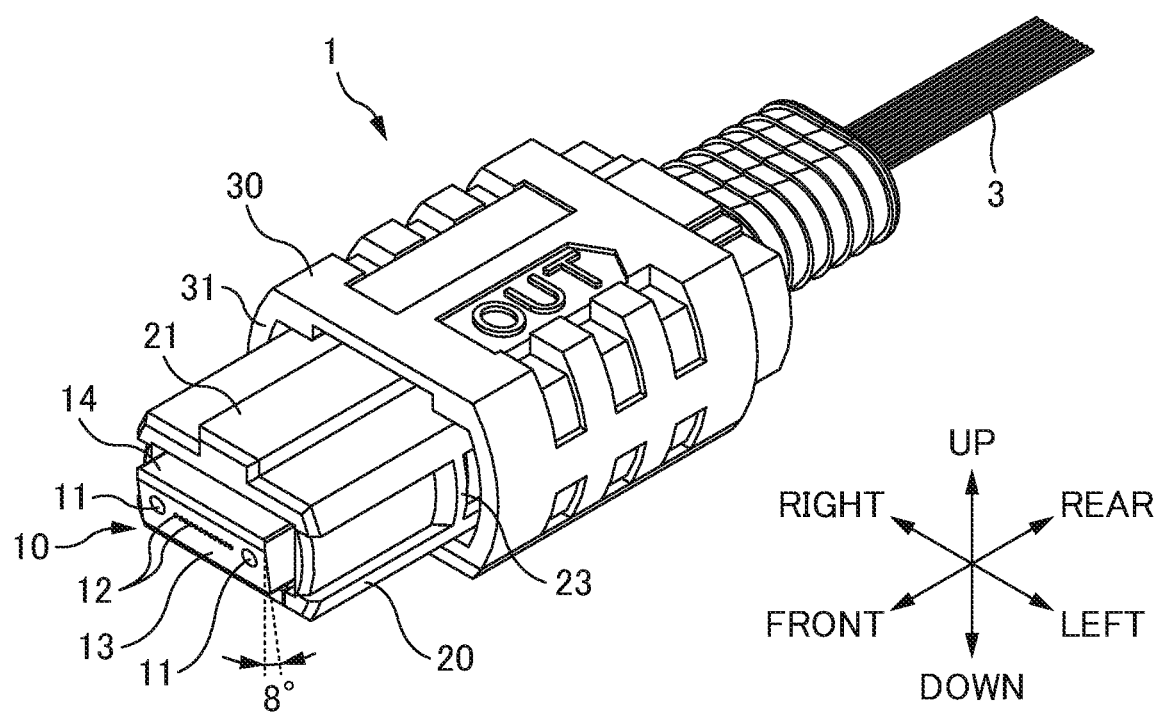
FIGS. 1A and 1B are perspective views of an optical connector 1 according to one or more embodiments.

At least the following features are disclosed in the following description and accompanying drawings.

Disclosed is an optical connector that includes: a ferrule including a guide pin hole, a plurality of fiber holes lined up in a width direction, and an inclined end face; a housing that houses the ferrule in a recedably pressed manner; and an application part that is configured to apply an upward force to the ferrule when connecting the optical connector with a counterpart connector, wherein a direction that is orthogonal to a connector connecting/disconnecting direction and to the width direction is defined as "up/down direction", and a side of the inclined end face that projects toward the counterpart connector is defined as "up". With this optical connector, low loss can be achieved stably.

The application part may apply an upward force to the ferrule after fitting together a guide pin and a guide pin hole when connecting the optical connector with the counterpart connector. Thus, damage to the inclined end face of the ferrule can be suppressed.

The application part may apply an upward force to the ferrule before said inclined end face of said ferrule comes into contact with an inclined end face of a ferrule of the counterpart connector. Thus, an upward force can be applied to the ferrule before friction force acts on the inclined end face of the ferrule.

The application part may release the force applied to the ferrule after applying the upward force to the ferrule. Thus, the durability of the optical connector is improved.

The application part may release the force applied to the ferrule after said inclined end face of said ferrule comes into contact with an inclined end face of a ferrule of the counterpart connector. Thus, it is easy to maintain a state where the ferrule is displaced upward by an amount anticipated beforehand.

The application part may apply an upward force to the ferrule by contacting a body part of the ferrule. Thus, force can be applied to a section close to the inclined end face, and thus, the end face of an optical fiber can be displaced upward by an amount anticipated beforehand.

The application part may apply an upward force to the ferrule by contacting a collar part of the ferrule. Alternatively, the application part may apply an upward force to the ferrule by applying force to a member arranged on a rear side of the ferrule.

A coupling may be mounted to the housing; and the application part applies an upward force to the ferrule in conjunction with movement of the coupling with respect to the housing. Because the amount of movement of the coupling at the time of connecting the connector is relatively large, it is easier to apply a large force and displacement to the ferrule compared to a configuration where force is applied to the ferrule in conjunction with the movement of the ferrule.

The application part may include a pressing part provided to the coupling; and when the coupling recedes with respect to the housing (i.e., retracts into the housing), the pressing part presses the ferrule upward by moving upward while receding along a guide face (i.e., retracts along a guide face) provided to the housing. Thus, an upward force can be applied to the ferrule by pressing.

The application part may include a pressing part provided to the housing; and when the coupling recedes with respect to the housing, the pressing part presses the ferrule upward by receiving force from the coupling. Thus, an upward force can be applied to the ferrule in conjunction with the movement of the coupling with respect to the housing, even in cases where the pressing part is not provided to the coupling.

The pressing part may be provided on an opposite side from a side of the housing where a key is provided. Thus, the pressing part can be arranged without being constrained by the arrangement of the key.

The application part may apply an upward force to the ferrule in conjunction with movement of the ferrule with respect to the housing. Thus, an upward force can be applied to the ferrule without being in conjunction with the movement of the coupling.

The application part may include a protrusion that moves together with the ferrule, and a contact part provided to the housing; and when the ferrule recedes with respect to the housing, the ferrule receives an upward force from the protrusion due to the protrusion coming into contact with the contact part. Thus, an upward force can be applied to the ferrule in conjunction with the movement of the ferrule with a simple configuration.

When the ferrule recedes with respect to the housing, the upward force to the ferrule may be released due to the protrusion moving over the contact part. Thus, the durability of the optical connector is improved.

A depression may be formed in a lower surface of the ferrule; and the protrusion is provided in the depression so as not to protrude below the lower surface of the ferrule. Thus, the lower surface of the ferrule can easily be used as a reference surface.

The application part may be a spring that presses the ferrule frontward with respect to the housing; and a seat part at a rear end of the spring is inclined with respect to a plane perpendicular to an axial direction of the spring. Thus, an upward force can be applied to the ferrule with a simple configuration.

Also disclosed is a method for connecting an optical connector that includes: a ferrule including a guide pin hole, a plurality of fiber holes lined up in a width direction, and an inclined end face; and a housing that houses the ferrule in a recedably pressed manner, the method involving: applying an upward force to the ferrule when connecting the optical connector with a counterpart connector, wherein a direction that is orthogonal to a connector connecting/disconnecting direction and to the width direction is defined as "up/down direction", and a side of the inclined end face that projects toward the counterpart connector is defined as "up". With this optical connector connecting method, low loss can be achieved stably.

Figure 1B:
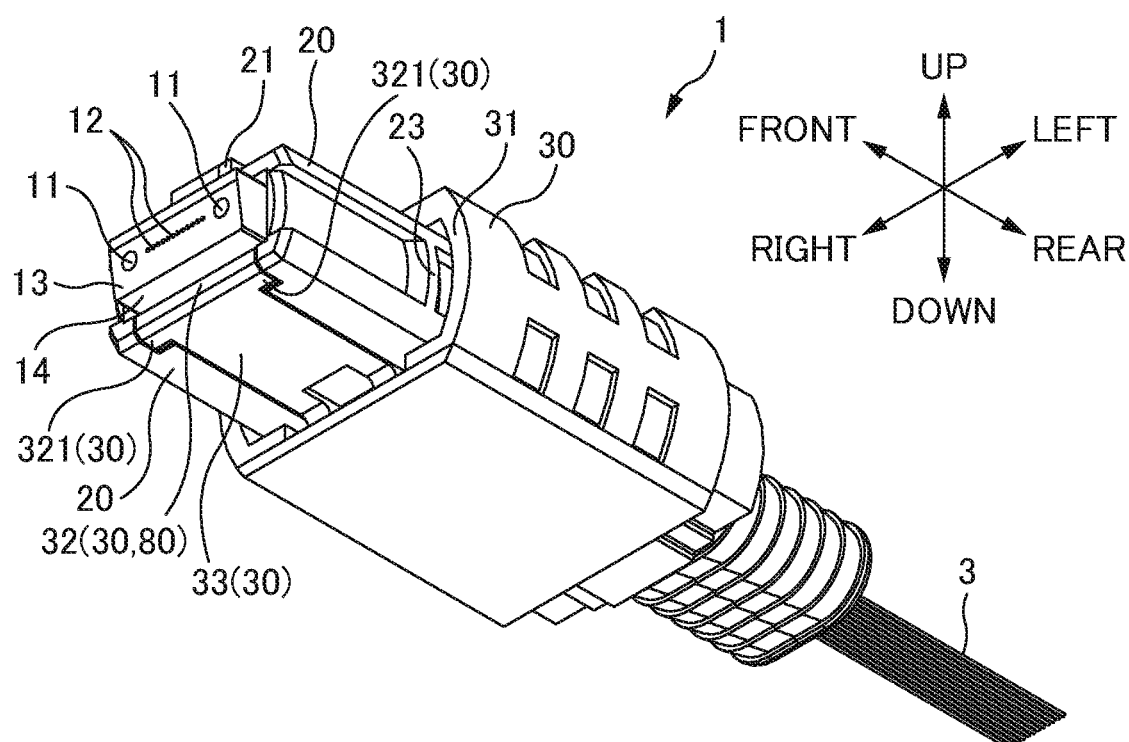
Figure 2:
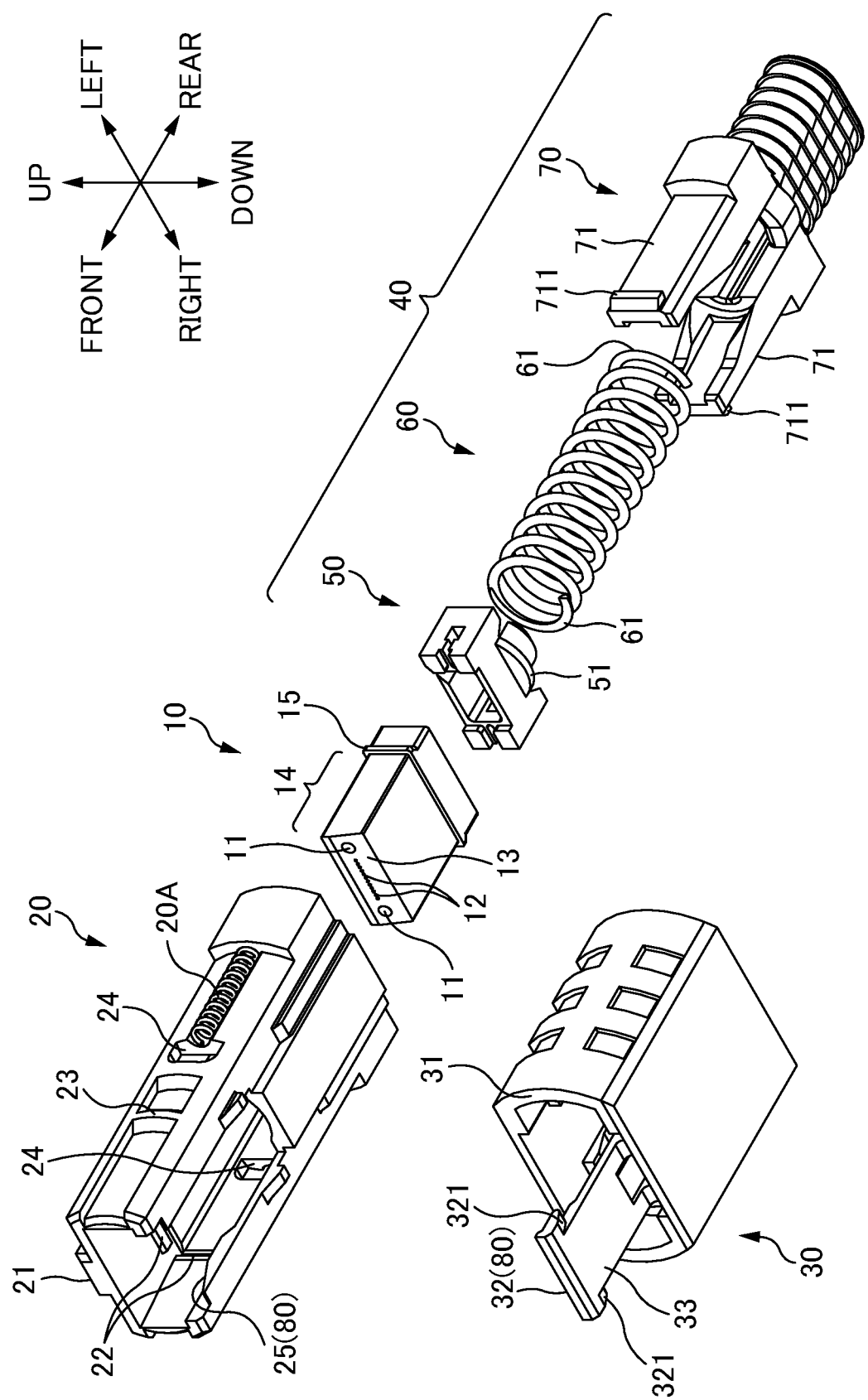
FIG. 2 is an exploded perspective view of the optical connector 1 according to one or more embodiments.

FIGS. 1A and 1B are perspective views of an optical connector 1 according to one or more embodiments. FIG. 2 is an exploded perspective view of the optical connector 1 according to one or more embodiments.

In the description below, the various directions are defined as illustrated in FIGS. 1A and 1B. That is, the connecting/disconnecting direction (attaching/detaching direction) of the optical connector 1 is defined as "front/rear direction", wherein the side toward a counterpart connector (not illustrated) is defined as "front", and the opposite side is defined as "rear". In other words, the front/read direction is the "length direction" of the optical connector 1. The direction in which a pair of guide pin holes 11 is lined up and in which a plurality of optical fiber holes 12 are lined up is defined as "left/right direction", wherein the right-hand side when viewed from the rear toward the front is defined as "right", and the opposite side is defined as "left". In other words, the left/right direction is the "width direction" of the optical connector 1. The direction orthogonal to the "front/rear direction" and the "left/right direction (width direction)" is defined as "up/down direction", wherein the side of an inclined end face 13 of a ferrule 10 that projects toward the front side (toward a counterpart connector) is defined as "up", and the opposite side is defined as "down". The optical connector 1's side where a key 21 is provided is "up". In other words, the up/down direction is the "height direction" of the optical connector 1.

The optical connector 1 is a multifiber push-on (MPO) optical connector compliant with, for example, JIS C5982 or IEC 61754-7. The optical connector 1 includes a ferrule 10 and a housing 20.

The ferrule 10 is a member that retains an end portion of optical fibers 3. The ferrule 10 includes guide pin holes 11, a plurality of fiber holes 12, and an inclined end face 13. The ferrule 10 also includes a body part 14 and a collar part 15. The collar part 15 is a section located more toward the rear side than the body part 14 and is a section that projects more outward than the body part 14.

Each guide pin hole 11 is a hole in which a guide pin 111 is to be inserted. In cases where the optical connector 1 is a male-type connector, a guide pin 111 is inserted in advance in each guide pin hole 11 such that an end portion of the guide pin 111 projects from the guide pin hole 11. In cases where the optical connector 1 is a female-type connector, a guide pin 111 of a counterpart connector will be inserted into the guide pin hole 11. Positioning between ferrules 10 is achieved by fitting respective guide pins 111 into the guide pin holes 11 at the time of connecting the connectors. The guide pin hole 11 thus serves as a section constituting a positioning part together with the guide pin 111.

The fiber holes 12 are holes in which end portions of respective optical fibers 3 are to be inserted. An end portion of an optical fiber 3 is fixed in each fiber hole 12. In one or more embodiments, the optical fiber 3 inserted in each fiber hole 12 is a single-mode optical fiber, but it may be a multi-mode optical fiber.

The inclined end face 13 is a connecting end face that is to be connected with a ferrule of a counterpart connector. The inclined end face 13 is inclined by about 8 degrees with respect to a plane perpendicular to the optical axis of the optical fibers 3. The inclined end face 13 is formed by being obliquely polished together with the respective end faces of the optical fibers 3 inserted in the respective fiber holes 12. Inclining the end face of the optical fiber 3 reduces the light reflection amount at the connection point.

The housing 20 is a cylindrical member that houses the ferrule 10 in a recedably pressed manner. An inwardly-projecting projection 22 is provided on the inner wall surface of the housing 20. The projection 22 comes into contact with the collar part 15 of the ferrule 10, and thereby, the ferrule 10, which is being pressed frontward, is prevented from falling out toward the front. Engagement parts 23 onto which claws 91 (described later) of an adapter 90 are latched are formed in the respective side surfaces of the housing 20.

A coupling 30 is arranged outside the housing 20. The coupling 30 is a joining member that retains a state (latched state) in which claws 91 (described later) of an adapter 90 are caught by the engagement parts 23 of the housing 20. The coupling 30 is provided so as to be slidable in the front/rear direction with respect to the housing 20. Springs 20A are arranged between the coupling 30 and the housing 20, and the springs 20A recedably press the coupling 30 frontward with respect to the housing 20. When in a state (latched state) in which the claws 91 of the adapter 90 (described later) are caught by the engagement parts 23 of the housing 20, the inner wall surface of the coupling 30 prevents the claws 91 of the adapter 90 from opening outward, thereby retaining the latched state. When removing the optical connector 1, the coupling 30 is slid rearward with respect to the housing 20, and this allows the claws 91 of the adapter 90 to open outward, thereby releasing the latched state.

The housing 20 also houses a floating mechanism 40 that presses the ferrule 10 frontward. FIG. 2 illustrates a floating mechanism 40 housed in the housing 20.

The floating mechanism 40 is a mechanism that presses the ferrule 10 frontward. The floating mechanism 40 includes a pin clamp 50, a spring 60, and a spring push member 70. The pin clamp 50 is a member arranged on the rear side of the ferrule 10. In cases where the optical connector 1 is a male-type connector, the pin clamp 50 retains the respective rear ends of the guide pins 111. In this case, the guide pins 111 will penetrate the respective guide pin holes 11 in the ferrule 10, and the respective tip ends of the guide pins 111 will project out from the inclined end face 13. A front end portion of the spring 60 is fixed to the rear portion of the pin clamp 50. The spring 60 is an elastic member that applies pressing force for pressing the ferrule 10 frontward. The spring 60 is housed in the housing 20 in a compressed and deformed state between the pin clamp 50 and the spring push member 70. The front end portion of the spring 60 is fixed to the pin clamp 50, and the rear end portion of the spring 60 is fixed to the spring push member 70. The spring push member 70 is a member that allows the spring 60 to be housed in the housing 20 in a compressed state. The spring push member 70 includes a pair of arms 71. The spring 60 is housed in a space between the pair of arms 71. At the front end of each arm 71, a lug 711 is formed outwardly. By making the lug 711 engage with a window 24 formed in the side surface of the housing 20, the spring 60 is housed inside the housing 20 in a compressed state. Thus, the ferrule 10 is pressed frontward via the pin clamp 50 by the opposing force of the compressed-and-deformed spring 60.

Figure 3A:
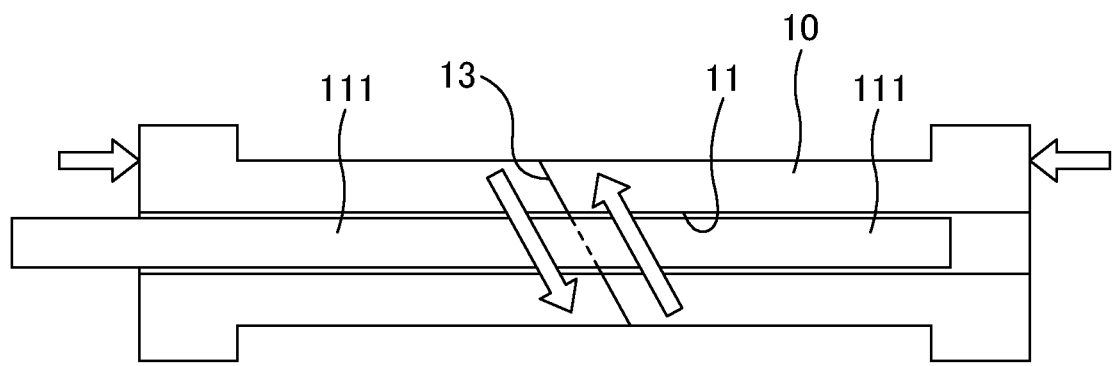
FIGS. 3A and 3B are explanatory diagrams illustrating axial misalignment between ferrules 10.
Figure 3B:
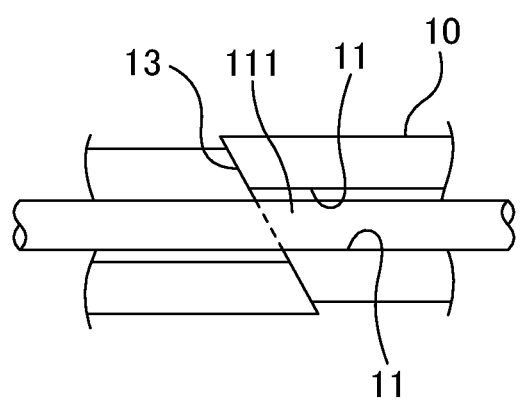

FIGS. 3A and 3B are explanatory diagrams illustrating axial misalignment between ferrules 10.

As described above, positioning between ferrules 10 is achieved by fitting respective guide pins 111 into the guide pin holes 11 at the time of connecting the connectors. Note, however, that the diameter of the guide pin hole 11 is formed larger than the diameter of the guide pin 111, and thus, there is a clearance (gap) between the guide pin hole 11 and the guide pin 111. Meanwhile, the ferrule 10 has an inclined end face 13, and at the time of connecting the connectors, the respective inclined end faces 13 of the ferrules 10 butt against one another in a frontwardly-pressed state. As a result, the ferrule 10 shifts so as to slide along the inclined end face 13 of the counterpart connector, thereby causing the ferrule 10 to be relatively displaced in the up/down direction.

So, taking into account beforehand the amount of positional displacement as illustrated in FIG. 3B, the fiber holes 12 of the ferrule 10 according to one or more embodiments are provided at a position slightly deviated in the up/down direction from the guide pin hole 11's central axis. As illustrated in FIG. 3B, it is anticipated that the ferrule 10 will be relatively displaced in the up/down direction until the lower edge of the guide pin 111 comes into contact with the lower edge of the guide pin hole 11. So, when the diameter of the guide pin 111 is defined as D1 and the diameter of the guide pin hole 11 is defined as D2, the fiber holes 12 are provided at a position that is deviated in the up/down direction from the guide pin hole 11's central axis by an offset amount of (D2−D1)/2. It should be noted that, in cases where the fiber holes 12 are inclined with respect to the guide pin hole 11, the offset amount is not necessarily limited to (D2−D1)/2, as it is necessary to take into account eccentricity caused during oblique polishing.

As described above, the optical fiber holes 12 are provided at a position that takes into account beforehand the amount of vertical displacement of the ferrule 10. So, if the ferrule 10 is not vertically displaced by the previously anticipated amount at the time of butting the connecting end faces of the ferrules 10 against one another, this will lead to an increase in connection loss between optical fibers 3. Note that, friction force between the inclined end faces 13 may inhibit the ferrules 10 from getting vertically displaced by the previously anticipated amount. More specifically, there are cases where the ferrules 10 are not relatively displaced in the up/down direction to an extent that the lower edge of the guide pin 111 contacts the lower edge of the guide pin hole 11 as illustrated in FIG. 3B.

So, as described below, the optical connector 1 according to one or more embodiments includes an application part 80 that is configured to apply an upward force to the ferrule 10 when connecting the connector. By making the application part 80 apply an upward force to the ferrule 10, the optical connector 1 can connect with a counterpart connector in a state where the ferrule 10 is displaced in the up/down direction by the previously anticipated amount (see FIG. 3B). Thus, connection loss between optical fibers 3 can be suppressed, and low loss can be achieved stably.

The application part 80 according to one or more embodiments includes a pressing part 32 provided to the coupling 30 (see FIG. 1B and FIG. 2). The pressing part 32 is a section that applies an upward force to the ferrule 10 by pressing the ferrule 10. The pressing part 32 according to one or more embodiment directly applies pressing force to the ferrule 10 by directly contacting the lower surface of the ferrule 10.

The pressing part 32 according to one or more embodiments is arranged below the body part 14 of the ferrule 10. Thus, the pressing part 32 applies an upward force to the body part 14 of the ferrule 10. Applying an upward force to the body part 14 of the ferrule 10 is advantageous, because it is possible to apply force to a section closer to the inclined end face 13 compared to cases where an upward force is applied to the collar part 15 of the ferrule 10, and thereby the end face of the optical fibers 3 can be displaced upward by the previously anticipated amount.

In one or more embodiments, the pressing part 32 is arranged at the front edge of the housing 20 (see FIG. 1B). This is advantageous because force can be applied to a section close to the inclined end face 13 of the ferrule 10. If the pressing part 32 is arranged so as to protrude more toward the front than the front edge of the housing 20, then, at the time of connecting the connectors, the pressing part 32 may come into contact with the counterpart connector or the adapter 90. Thus, in cases of providing the pressing part 32 as much as possible toward the front side, the pressing part 32 may be arranged at the front edge of the housing 20, as in one or more embodiments.

In cases of applying an upward force to the ferrule 10 by pressing the ferrule 10, the pressing part 32 is provided on the opposite side from the side of the housing 20 where a key 21 is provided. In MPO connectors, the side of the inclined end face 13 of the ferrule 10 provided with the key 21 is the side that projects toward the counterpart connector. Thus, the pressing part 32 is formed on the side where the key 21 is not provided. This is advantageous in cases of applying an upward force to the ferrule 10 by pressing the ferrule 10, because the pressing part 32 can be arranged without being constrained by the arrangement of the key 21.

The pressing part 32 is joined to the coupling 30 via a joining part 33. In one or more embodiments, the pressing part 32 and the joining part 33 are molded integrally with the coupling 30, but the pressing part 32 and the joining part 33 may be formed as separate members from the coupling 30.

The joining part 33 is a plate-shaped member that extends frontward from the front edge of the coupling 30. The rear end of the joining part 33 is fixed to the coupling 30, and the pressing part 32 is formed at the front end of the joining part 33. The joining part 33 is formed in a cantilever fashion, and is elastically deformable. The elastic deformation of the joining part 33 enables the pressing part 32 to be displaced in the up/down (vertical) direction.

The pressing part 32 according to one or more embodiments includes slide parts 321. The slide part 321 is a section that comes into contact with a guide face 25 of the housing 20. The pressing part 32 is formed wider than the joining part 33, and the sections projecting outward toward the left and right from the joining part 33 constitute the slide parts 321. Stated differently, a pair of slide parts 321 is formed, one on each of the left and right edges of the pressing part 32. By forming a pair of left and right slide parts 321, the displacement of the pressing part 32 in the up/down direction can be made more stable compared to cases where the slide part 321 is provided only in one location.

The housing 20 according to one or more embodiments has guide faces 25 at sections that come into contact with the respective slide parts 321. The guide face 25 is formed on the lower-side inner wall of the housing 20, and is formed as an inclined surface that rises toward the rear. The guide face 25 serves as a section that guides the slide part 321. As the slide parts 321 are guided along the respective guide faces 25, the pressing part 32 is displaced so as to move closer to or away from the lower surface of the ferrule 10. In one or more embodiments, a pair of slide parts 321 are included, and thus a pair of guide faces 25 are also included.

FIGS. 4A to 4D are explanatory diagrams illustrating how the connector is connected in one or more embodiments. The optical connector 1 according to one or more embodiments is illustrated on the right-hand side in each figure. A counterpart connector and claws 91 of an adapter 90 are illustrated on the left-hand side in each figure. To illustrate the counterpart connector and the claws 91, which are inside the adapter 90, the outer structure of the adapter 90 is illustrated transparently by a dotted line. The upper diagram in each figure illustrates a top view, and the lower diagram illustrates a side view. The side view in each figure also illustrates an enlarged cross-sectional view of the pressing part 32's slide part 321 and the housing 20's guide face 25.

As illustrated in FIG. 4A, at the time of connecting the connectors, an operator inserts the optical connector 1 into the adapter 90. The operator matches the key 21 of the optical connector 1 with a key groove (not illustrated) of the adapter 90 to thereby correctly orient the optical connector 1 in the up/down (vertical) direction, and in this state, inserts the front portion of the optical connector 1's housing 20 between the pair of claws 91 of the adapter 90. In one or more embodiments, as illustrated in FIG. 4A, the optical connector 1 being inserted into the adapter 90 is a female-type connector, and the counterpart connector inside the adapter 90 is a male-type connector, but the male/female types may be reversed.

Figure 4B:
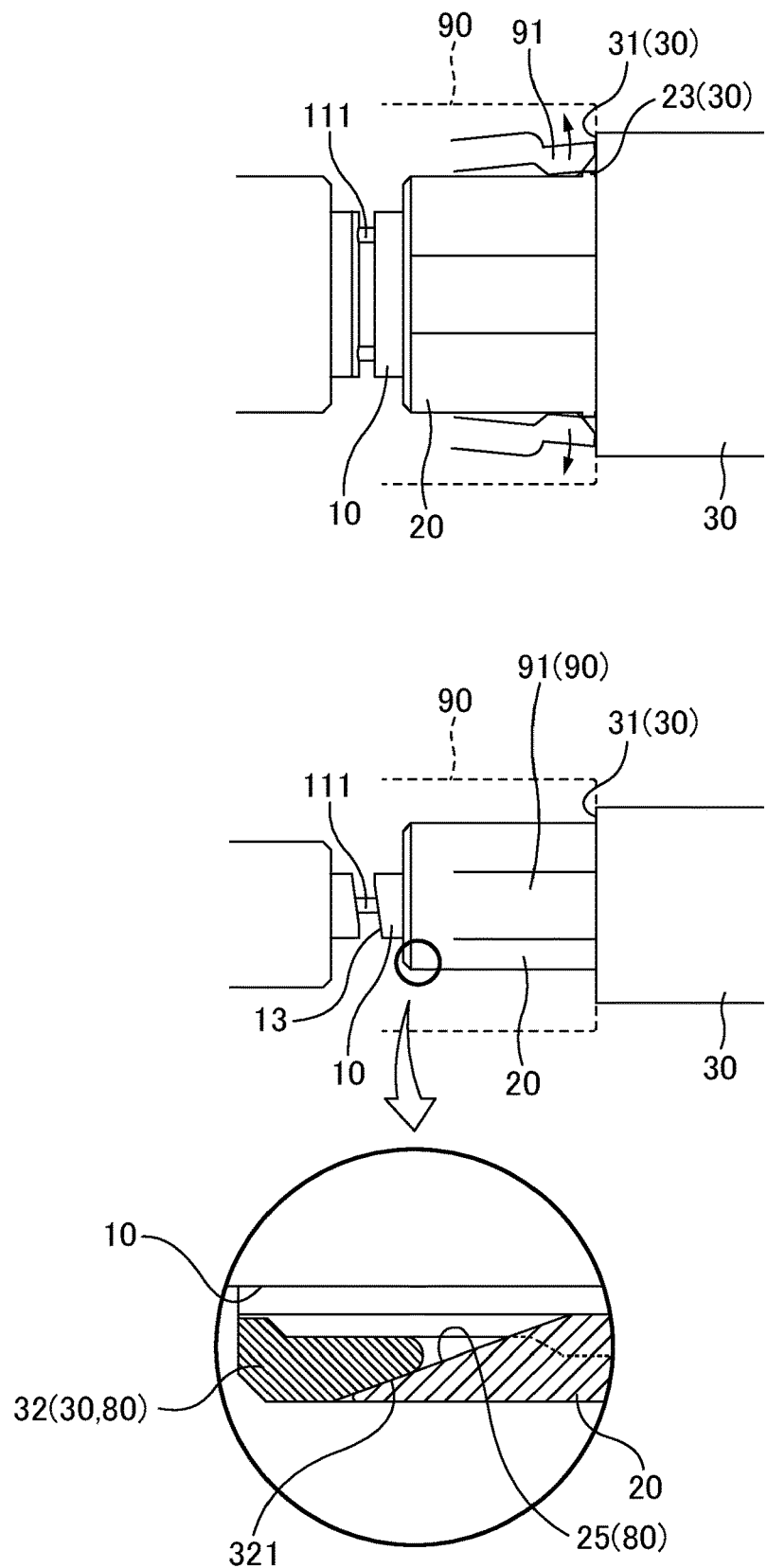
FIG. 4B is a second explanatory diagram illustrating how the connector is connected in one or more embodiments.

As the optical connector 1 is inserted into the adapter 90 and the optical connector 1 is brought closer to the counterpart connector, the claws 91 of the adapter 90 move over the respective engagement parts 23 of the housing 20 and open outward, and the claws 91 of the adapter 90 come into contact with the front end surface 31 of the coupling 30, as illustrated in FIG. 4B. In one or more embodiments, as illustrated in FIG. 4B, at the stage where the claws 91 of the adapter 90 contact the front end surface 31 of the coupling 30, the guide pins 111 of the counterpart connector are already fitted inside the respective guide pin holes 11 of the optical connector 1. Stated differently, in one or more embodiments, the claws 91 of the adapter 90 come into contact with the front end surface 31 of the coupling 30 after the guide pins 111 of the counterpart connector have been fitted inside the respective guide pin holes 11 of the optical connector 1. Thus, as described further below, an upward force is applied to the ferrule 10 after the guide pins 111 of the counterpart connector have been fitted inside the respective guide pin holes 11 of the optical connector 1.

Figure 4C:
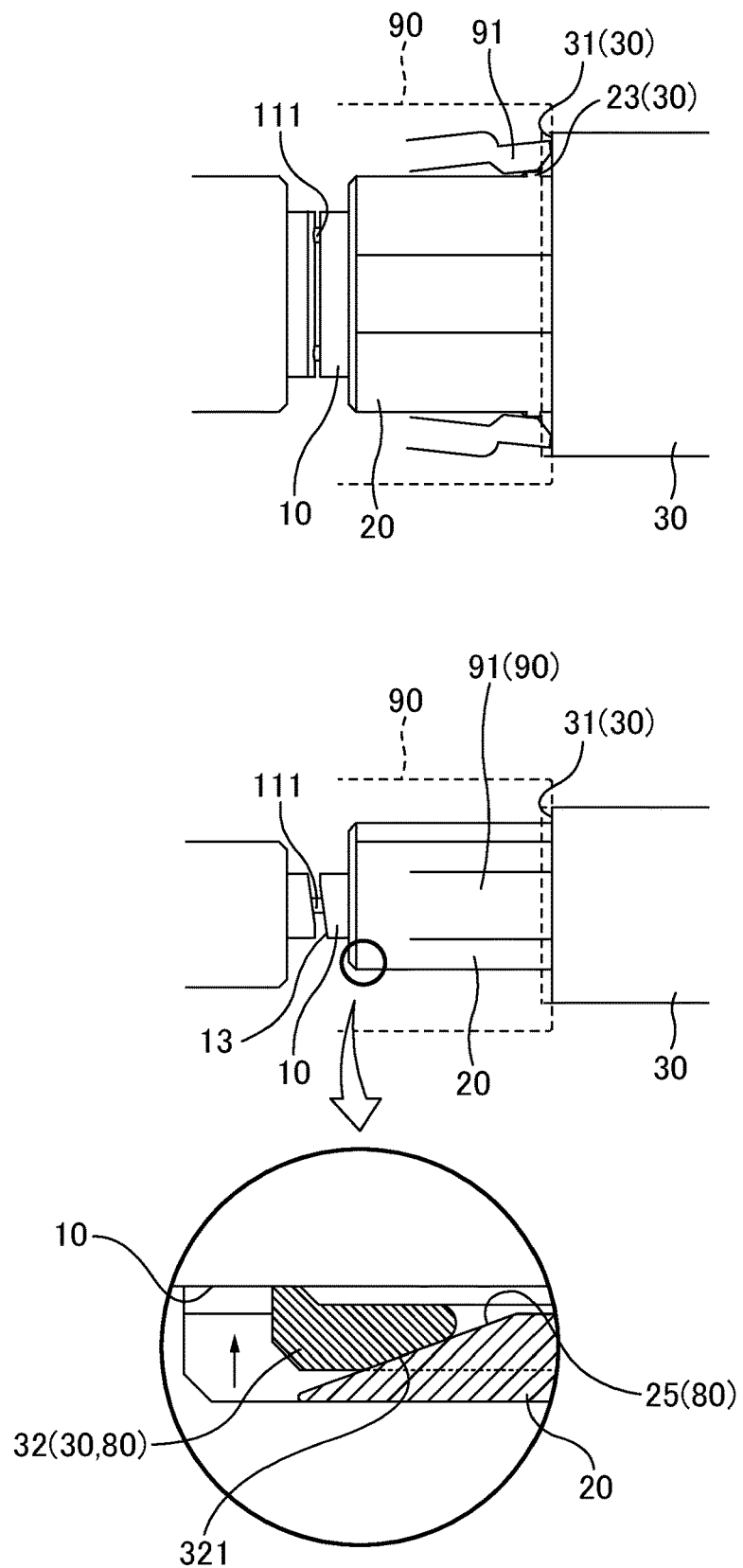
FIG. 4C is a third explanatory diagram illustrating how the connector is connected in one or more embodiments.

When the operator further inserts the optical connector 1 into the adapter 90 from the state illustrated in FIG. 4B, the claws 91 of the adapter 90 cause the coupling 30 to slide rearward with respect to the housing 20, as illustrated in FIG. 4C. In one or more embodiments, the pressing part 32 is provided to the coupling 30, and thus, the pressing part 32 also moves rearward relative to the housing 20 together with the coupling 30. At this time, as illustrated in FIG. 4C, the slide parts 321 of the pressing part 32 move upward while receding along the respective guide faces 25 of the housing 20; thereby, the pressing part 32 is displaced toward the lower surface of the ferrule 10 (i.e., the joining part 33 elastically deforms) and thus the pressing part 32 comes into contact with the lower surface of the ferrule 10; and thus, the pressing part 32 presses the ferrule 10. As a result of the pressing part 32 pressing the ferrule 10, an upward force is applied to the ferrule 10.

As illustrated in FIG. 4C, at the stage where the pressing part 32 is in contact with the lower surface of the ferrule 10, the guide pins 111 of the counterpart connector are already fitted inside the respective guide pin holes 11 of the optical connector 1. Stated differently, in one or more embodiments, the pressing part 32 comes into contact with the lower surface of the ferrule 10 after the guide pins 111 of the counterpart connector have been fitted inside the respective guide pin holes 11 of the optical connector 1. Thus, an upward force is applied to the ferrule 10 after the guide pins 111 of the counterpart connector have been fitted inside the respective guide pin holes 11 of the optical connector 1. If fitting of the guide pins 111 into the respective guide pin holes 11 is performed after applying an upward force to the ferrule 10, the guide pins 111 will protrude toward the end face of the ferrule 10 which has been displaced in the up/down direction, and thus, the guide pins 111 may damage the inclined end face 13 in the periphery of the guide pin holes 11. In contrast, according to one or more embodiments, such damage to the inclined end face 13 can be inhibited. Further, in one or more embodiments, an upward force is applied to the ferrule 10 after fitting together the guide pins 111 and the guide pin holes 11; thus, the ferrule 10 can be displaced upward until the lower edge of each guide pin 111 comes into contact with the lower edge of the respective guide pin hole 11 as illustrated in FIG. 3B, thereby making it possible to displace the ferrule 10 upward by the previously anticipated amount.

Further, as illustrated in FIG. 4C, at the stage where the pressing part 32 contacts the lower surface of the ferrule 10, the inclined end face 13 of the ferrule 10 is still not in contact with the inclined end face of the ferrule of the counterpart connector. Thus, in one or more embodiments, an upward force is applied to the ferrule 10 before the inclined end face 13 of the ferrule 10 comes into contact with the inclined end face of the ferrule of the counterpart connector. If an upward force is applied to the ferrule 10 after the inclined end face 13 of the ferrule 10 has contacted the inclined end face of the ferrule of the counterpart connector, then an upward force will be applied to the ferrule 10 in a state where friction force is acting on the inclined end face 13 of the ferrule 10. In contrast, in one or more embodiments, an upward force can be applied to the ferrule 10 before such friction force acts on the inclined end face 13 of the ferrule 10, and thus, it is easy to displace the ferrule 10 upward by the previously anticipated amount.

When the operator further inserts the optical connector 1 into the adapter 90 from the state illustrated in FIG. 4C, the inclined end face 13 of the ferrule 10 comes into contact with the inclined end face of the ferrule of the counterpart connector, as illustrated in FIG. 4D. At this time, the ferrule 10 receives force from the ferrule of the counterpart connector, and recedes with respect to the housing 20 against the elastic force of the spring 60 (see FIG. 2). The ferrules butt against one another by being pressed by the spring 60 with a predetermined force. In one or more embodiments, because an upward force has been applied to the ferrule 10, the optical connector 1 can be connected with the counterpart connector in a state where the ferrule 10 has been displaced upward by the previously anticipated amount (see FIG. 3B).

When the optical connector 1 is connected with the counterpart connector, the claws 91 of the adapter 90 move over the respective engagement parts 23 of the housing 20, engage with the respective engagement parts 23, and return to their original inwardly-closed state from the outwardly-opened state (see FIG. 4B). At this time, the coupling 30, which has been slid rearward by the claws 91 of the adapter 90, is returned to its original position by the springs 20A, and thus slides frontward with respect to the housing 20. As a result of the coupling 30 sliding frontward, the claws 91 of the adapter 90 are prevented from opening outward by the inner wall surface of the coupling 30, and a latched state is retained.

In one or more embodiments, since the pressing part 32 is provided to the coupling 30, when the coupling 30 moves frontward relative to the housing 20, the pressing part 32 also moves frontward relative to the housing 20 together with the coupling 30, as illustrated in FIG. 4D. At this time, as illustrated in FIG. 4D, the pressing part 32 moves away from the ferrule 10 (the elastic deformation of the joining part 33 returns to its original state) while the slide parts 321 of the pressing part 32 are guided along the respective guide faces 25 of the housing 20, and thus, the force applied to the ferrule 10 by the pressing part 32 is released. As described above, in one or more embodiments, after an upward force is once applied to the ferrule 10 at the time of connecting the connectors, the force applied to the ferrule 10 is released. If the upward force applied to the ferrule 10 is not released and the pressing part 32 keeps applying the upward force to the ferrule 10, the guide pins 111 will cause abrasion to the inner wall surface of the guide pin holes 11, and thus, the durability of the optical connector 1 is prone to deteriorate. In contrast, in one or more embodiments, by releasing the force applied to the ferrule 10, abrasion of the guide pin holes 11 can be suppressed, and thus, the durability of the optical connector 1 is improved.

In one or more embodiments, the upward force applied by the pressing part 32 to the ferrule 10 is released after the inclined end face 13 of the ferrule 10 has come into contact with the inclined end face of the ferrule of the counterpart connector. Thus, a state in which the ferrule 10 has been upwardly displaced by the previously anticipated amount can be maintained easily, even after releasing the upward force applied to the ferrule 10. Note, however, that the upward force applied to the ferrule 10 by the pressing part 32 may be released before the inclined end face 13 of the ferrule 10 comes into contact with the inclined end face of the ferrule of the counterpart connector, so long as the upwardly-displaced state of the ferrule 10 can be maintained even after releasing the force applied to the ferrule 10.

Figure 5A:
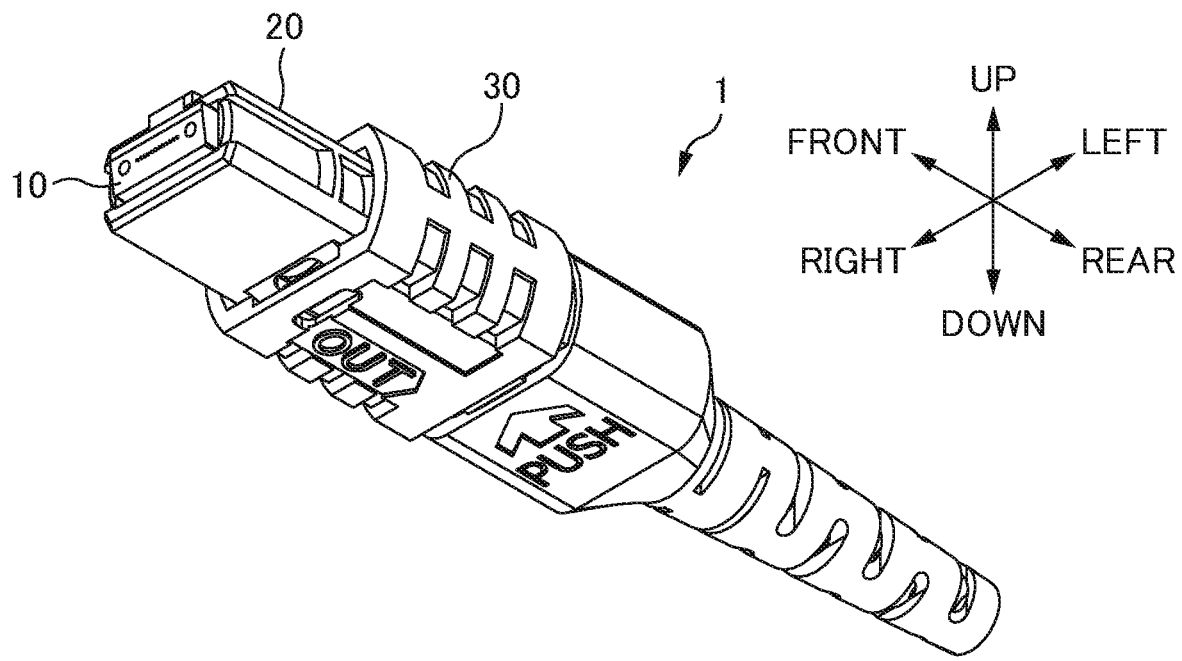
FIG. 5A is a perspective view of an optical connector 1 according to one or more embodiments.
Figure 5B:
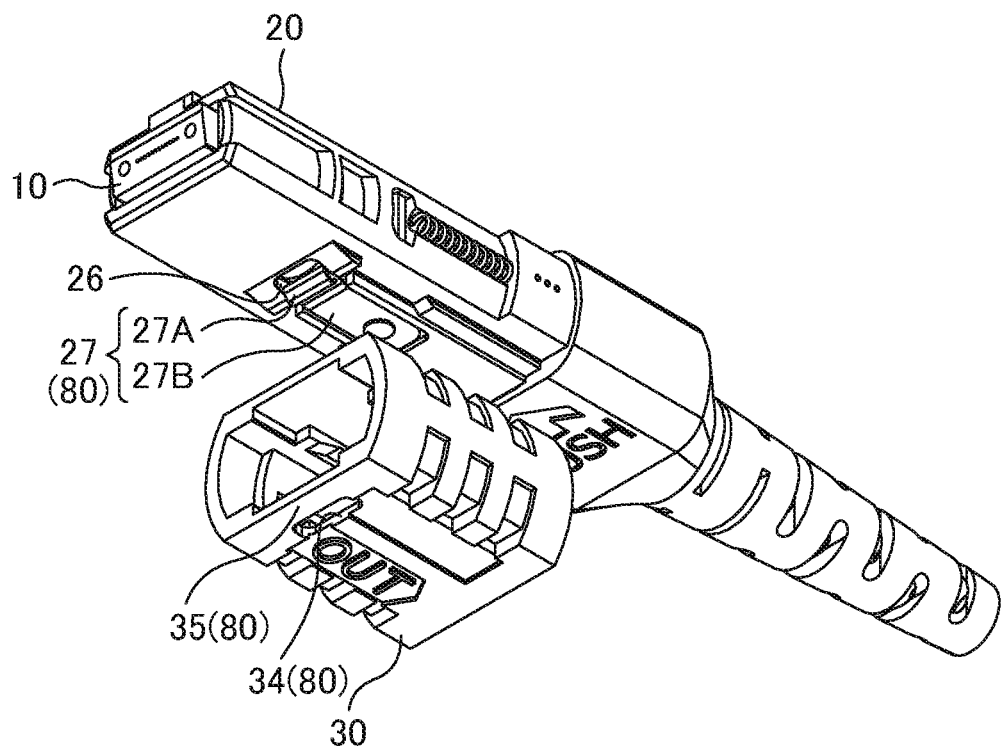
FIG. 5B is an exploded perspective view wherein the coupling 30 is removed from the optical connector 1 according to one or more embodiments.

FIG. 5A is a perspective view of an optical connector 1 according to one or more embodiments. FIG. 5B is an exploded perspective view wherein the coupling 30 is removed from the optical connector 1 according to one or more embodiments. The optical connector 1 (MPO connector) according to one or more embodiments includes a ferrule 10, a housing 20, and a coupling 30.

According to one or more embodiments, an application part 80 is also included that is configured to apply an upward force to the ferrule 10 when connecting the connector. The application part 80 according to one or more embodiments includes a pressing part 27A provided to the housing 20. The pressing part 27A according to one or more embodiments is also a section that applies an upward force to the ferrule 10. In one or more embodiments, however, instead of directly applying force to the ferrule 10 by contacting the ferrule 10, the pressing part 27A indirectly applies an upward force to the ferrule 10 by applying an upward force to a pin clamp 50 (i.e., a member arranged on the rear side of the ferrule 10).

A pressing member 27 is attached to the housing 20 according to one or more embodiments. The pressing member 27 includes the pressing part 27A and a fixing part 27B. The fixing part 27B is a section for fixing the pressing member 27 to the housing 20. In one or more embodiments, the housing 20 and the pressing part 27A are formed as separate members, but the housing 20 and the pressing part 27A may be formed integrally.

A pressing hole 26 is formed in the housing 20. The pressing hole 26 is a through hole formed in the lower wall of the housing 20. The pressing part 27A is arranged in the pressing hole 26. The pressing part 27A is capable of being displaced (deformed) in the up/down direction inside the pressing hole 26.

A release part 34 is formed in the coupling 30. The release part 34 is a section forming a space that allows the pressing part 27A to retreat. In this example, the release part 34 is a through hole, but it may be a non-through hole, such as a recess. The coupling 30's front edge 35, which is more toward the front than the release part 34, constitutes a section that presses the pressing part 27A.

Figure 6A:
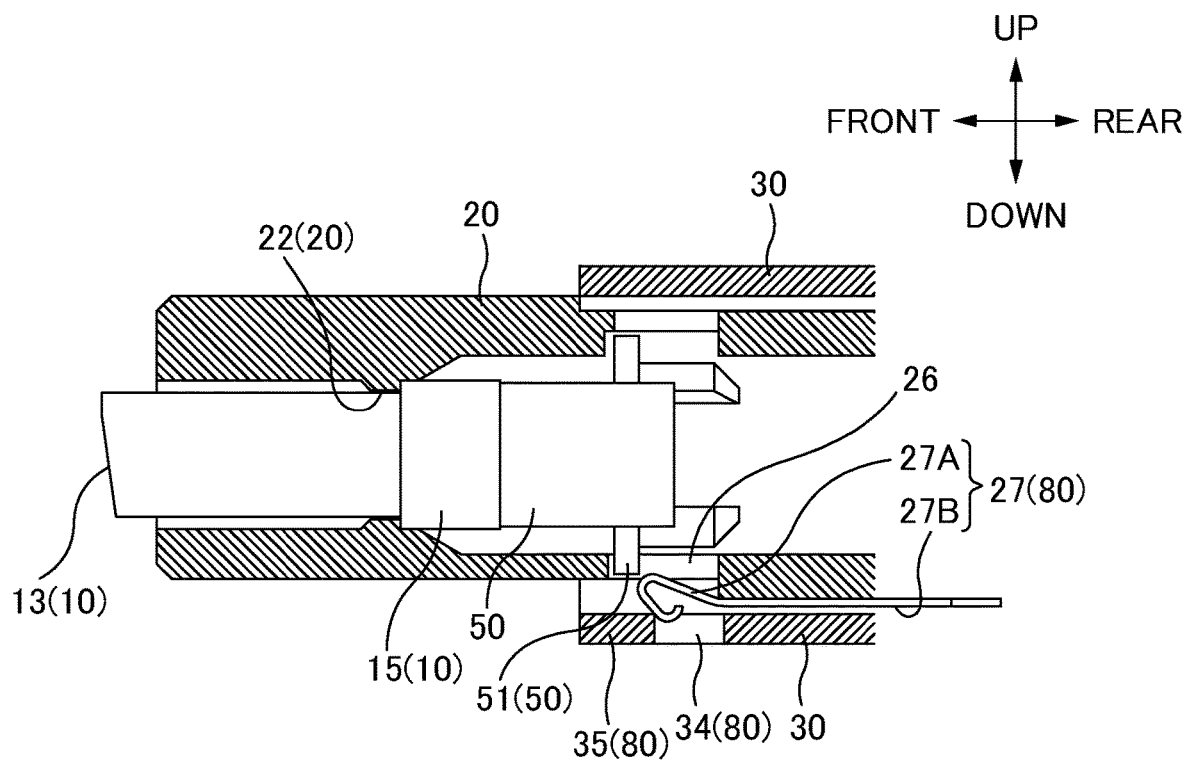
FIGS. 6A and 6B are explanatory diagrams illustrating how the connector is connected in one or more embodiments.
Figure 6B:
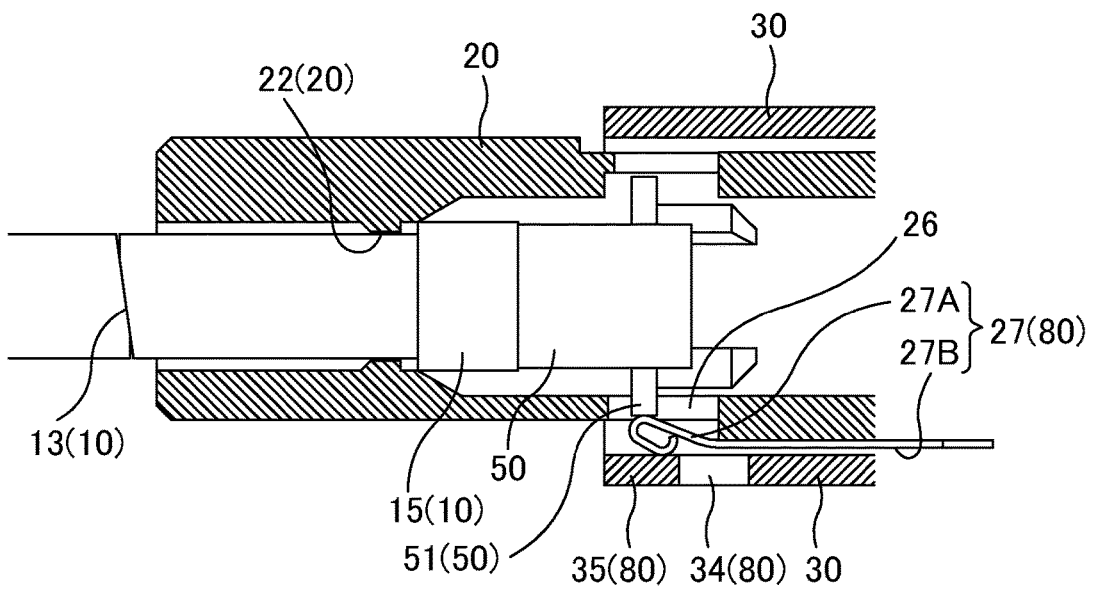

FIGS. 6A and 6B are explanatory diagrams illustrating how the connector is connected in one or more embodiments.

As illustrated in FIG. 6A, in a state before connection of the connector, the ferrule 10 is pressed frontward via the pin clamp 50 by the opposing force of the compressed-and-deformed spring 60 (not illustrated). Thus, the projection 22 on the inner wall surface of the housing 20 is in contact with the collar part 15 of the ferrule 10. At this stage, the pressing part 27A is located inside the space formed by the release part 34 of the coupling 30, and a flange part 51 of the pin clamp 50 is arranged more toward the front than the pressing part 27A; thus, the pressing part 27A is not in contact with the pin clamp 50.

When connecting the connector, as illustrated in FIG. 6B, the ferrule 10 receives force from the ferrule of the counterpart connector, and thereby, the ferrule 10 and the pin clamp 50 recede with respect to the housing 20 against the elastic force of the spring 60. As a result, the flange part 51 of the pin clamp 50 recedes to the position of the pressing part 27A. Further, when connecting the connector, as explained in FIGS. 4B and 4C, the claws 91 of the adapter 90 cause the coupling 30 to slide rearward with respect to the housing 20. When the coupling 30 slides rearward with respect to the housing 20, the pressing part 27A receives force from the front edge 35 of the coupling 30 and is displaced upward. Thus, the pressing part 27A presses the flange part 51 of the pin clamp 50. As described above, in one or more embodiments, the pressing part 27A, which has received force from the coupling 30, presses the pin clamp 50, and thereby, an upward force is applied to the ferrule 10.

In one or more embodiments, an upward force is applied to the ferrule 10 after the inclined end face 13 of the ferrule 10 has come into contact with the inclined end face of the ferrule of the counterpart connector. Thus, even if the ferrule 10 has not been displaced vertically by the previously anticipated amount because of friction force acting on the inclined end face 13 of the ferrule 10, the application of an upward force to the ferrule 10 can displace the ferrule 10 upward by the previously anticipated amount against the friction force acting on the inclined end face 13.

In one or more embodiments, at least a portion of the pressing part 27A needs to be arranged outside the housing 20 in order for the pressing part 27A to receive force from the coupling 30. On the other hand, the pressing part 27A needs to press the pin clamp 50 which is housed inside the housing 20. In one or more embodiments, the pressing part 27A's size is reduced by configuring the pressing part 27A so as to press the outer edge of the flange part 51 of the pin clamp 50.

In the embodiments described above, an upward force is applied to the ferrule 10 by pressing the ferrule 10 from below. However, the method for applying an upward force to the ferrule 10 is not limited to methods of pressing the ferrule 10 from below.

Figure 7A:
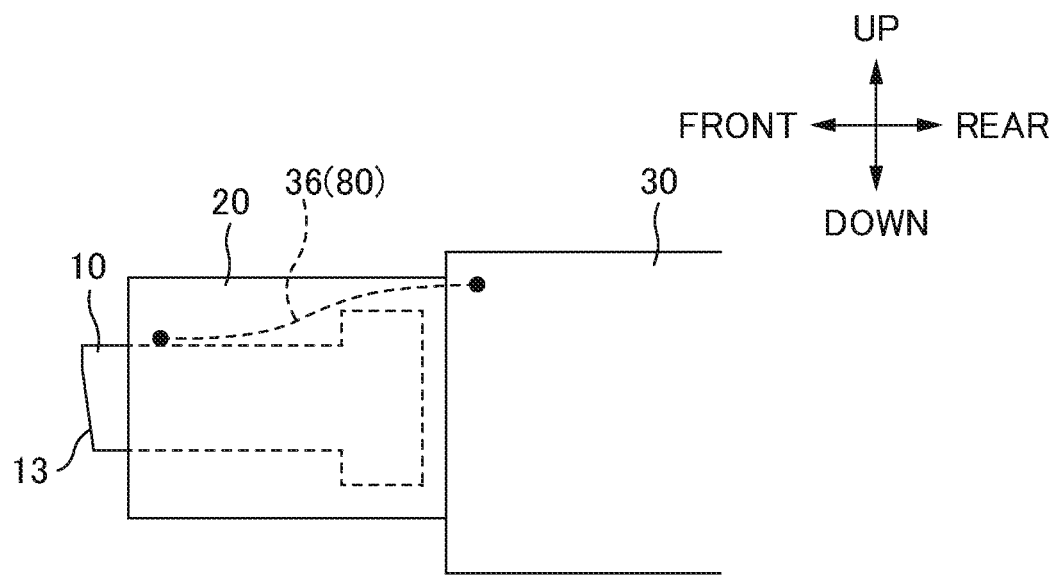
FIGS. 7A and 7B are schematic explanatory diagrams of an optical connector 1 according to one or more embodiments.
Figure 7B:
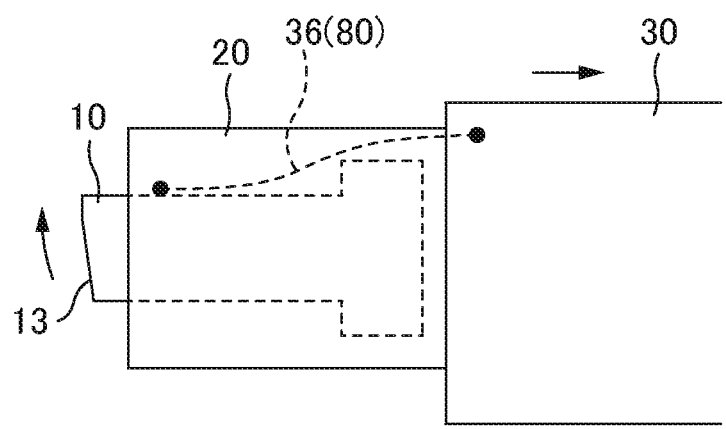

FIGS. 7A and 7B are schematic explanatory diagrams of an optical connector 1 according to one or more embodiments. The optical connector 1 according to one or more embodiments includes a ferrule 10, a housing 20, and a coupling 30.

According to one or more embodiments, an application part 80 is also included that is configured to apply an upward force to the ferrule 10 when connecting the connector. The application part 80 according to one or more embodiments includes a pulling member 36. One end of the pulling member 36 is fixed to the coupling 30, and the other end is fixed to the upper surface of the ferrule 10. In one or more embodiments, the pulling member 36 is a thread-like or string-like member, but it may be a sheet-like member.

When connecting the connector, as explained in FIGS. 4B and 4C, the claws 91 of the adapter 90 cause the coupling 30 to slide rearward with respect to the housing 20. When the coupling 30 slides rearward with respect to the housing 20, as illustrated in FIG. 7B, the pulling member 36's one end (the end fixed to the coupling 30) moves rearward, thereby causing the pulling member 36 to apply tension to the upper surface of the ferrule 10. As a result, an upward force is applied to the ferrule 10 at the inclined end face 13 of the ferrule 10.

In one or more embodiments, the pulling member 36 is constituted by an elastic member. In one or more embodiments, the pulling member 36 is a string-like rubber member. By constituting the pulling member 36 by an elastic member, the pulling member 36 stretches when the coupling 30 recedes and tension is applied to the pulling member 36 as illustrated in FIG. 7A, and this can prevent the ferrule 10 from receding before coming into contact with the counterpart connector's ferrule.

In the embodiments described above, the application part 80 applies an upward force to the ferrule 10 in conjunction with movement of the coupling 30 with respect to the housing 20. When connecting the connector, the movement amount of the coupling 30 (about 1.5 mm) is greater than the movement amount of the ferrule 10 (about 0.7 mm); thus, by adopting a configuration wherein force is applied to the ferrule 10 in conjunction with the movement of the coupling 30, it is easier to apply a large force and displacement to the ferrule 10 compared to a configuration where force is applied to the ferrule 10 in conjunction with the movement of the ferrule 10. However, as described in the following embodiments, the application part 80 may be configured so as to apply force to the ferrule 10 in conjunction with the movement of the ferrule 10.

Figure 8:
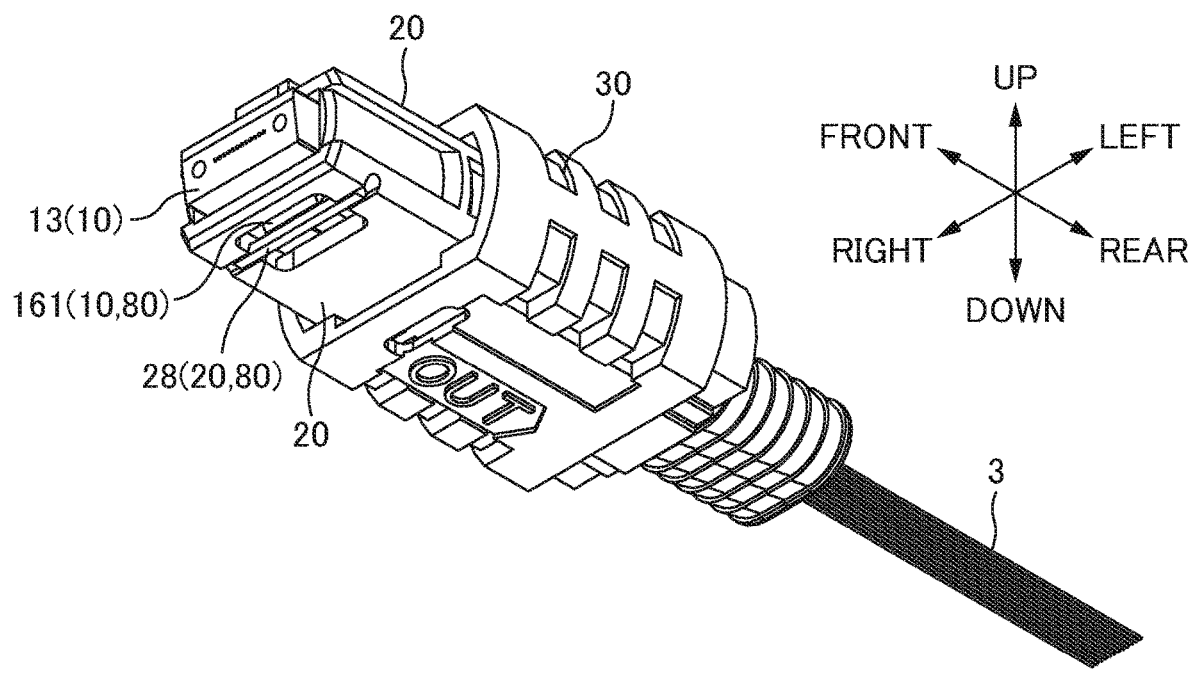
FIG. 8 is a perspective view of an optical connector 1 according to one or more embodiments.
Figure 9A:
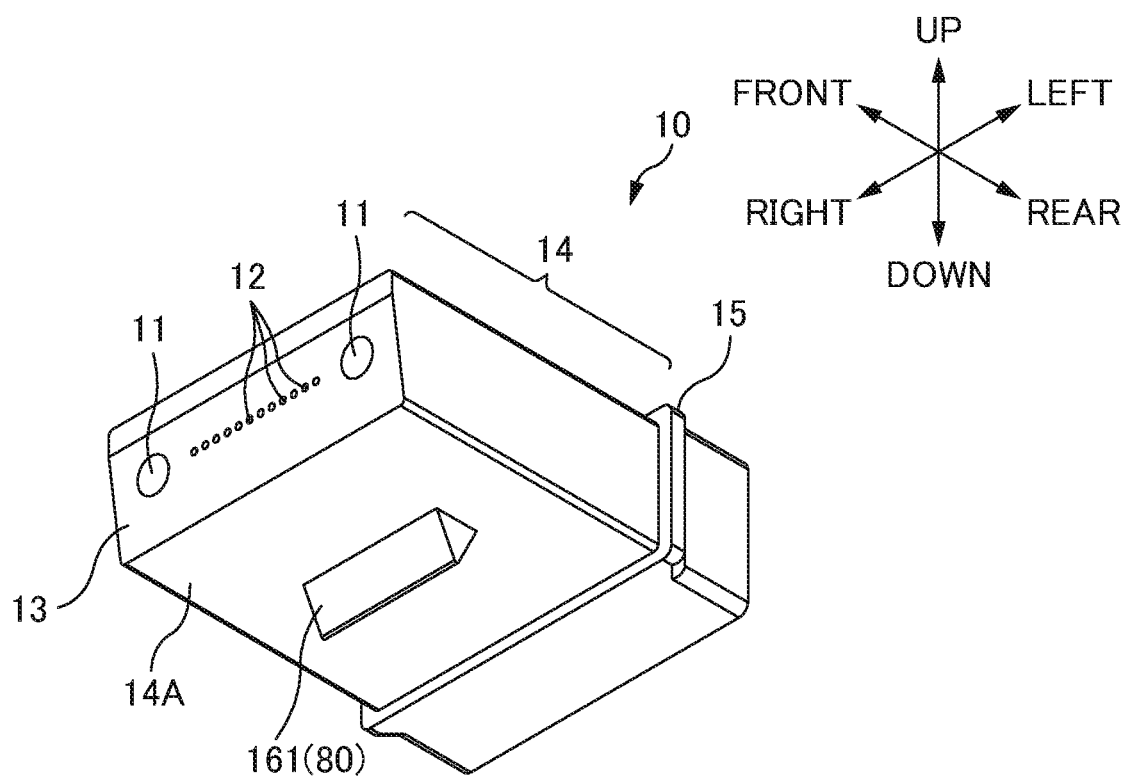
FIG. 9A is a perspective view of a ferrule 10 according to one or more embodiments.

FIG. 8 is a perspective view of an optical connector 1 according to one or more embodiments. FIG. 9A is a perspective view of a ferrule 10 according to one or more embodiments. The optical connector 1 according to one or more embodiments includes a ferrule 10 and a housing 20.

According to one or more embodiments, an application part 80 is also included that is configured to apply an upward force to the ferrule 10 when connecting the connector. The application part 80 according to one or more embodiments includes: a protrusion 161 provided to the ferrule 10; and a contact part 28 provided to the housing 20.

The protrusion 161 is a section provided on the lower side of the ferrule 10, and protrudes downward. In one or more embodiments, the protrusion 161 is formed as a ridge along the width direction, but it may be shaped like a pin. When viewed from the left/right direction, the protrusion 161 tapers downward, and is formed with a sharp tip. With this shape, as described further below, after the protrusion 161 moves onto the contact part 28, it can move over the contact part 28 easily. In one or more embodiments, the cross-sectional shape of the protrusion 161 as viewed from the left/right direction is triangular, but it may be semicircular with a rounded form. If the protrusion 161 does not have to move over the contact part 28, the protrusion 161 does not need to have a downwardly-tapered shape.

In one or more embodiments, as illustrated in FIG. 9A, the protrusion 161 is configured so as to protrude downward from the lower surface 14A of the ferrule 10. Note, however, that in cases where the lower surface 14A of the ferrule 10 is used as a reference surface for positioning the ferrule 10, the protrusion 161 may become a hindrance.

Figure 9B:
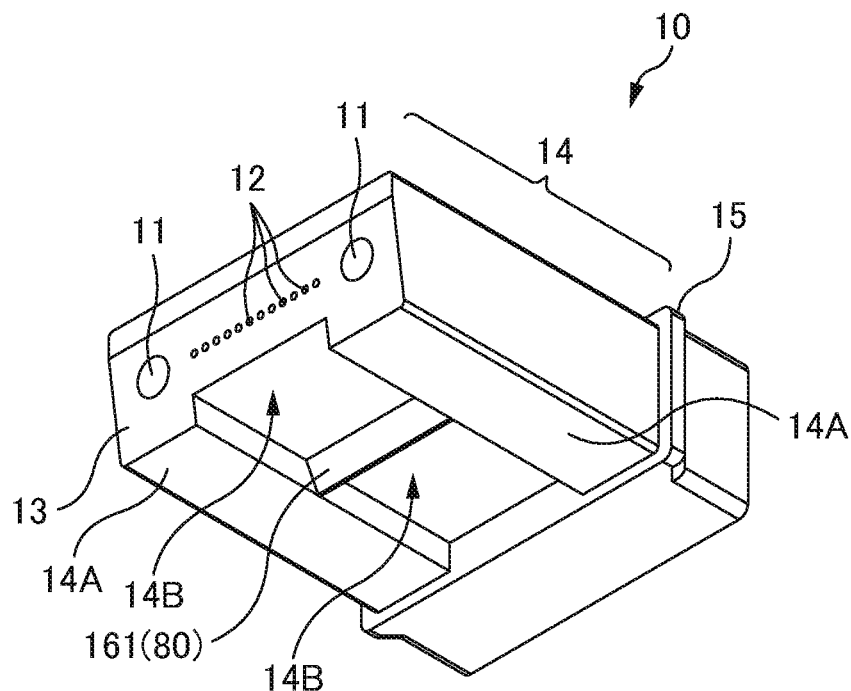
FIG. 9B is a perspective view of a ferrule 10 according to a first modified example of one or more embodiments.

FIG. 9B is a perspective view of a ferrule 10 according to a first modified example of the embodiments described above. In the first modified example, a depression 14B is formed in the lower surface 14A of the ferrule 10. Further, in the first modified example, the protrusion 161 is formed so as to protrude downward from the bottom surface of the depression 14B. In the first modified example, the protrusion 161 is formed in the depression 14B so as not to protrude from the lower surface 14A of the ferrule 10. In this way, the protrusion 161 does not become a hindrance in cases where the lower surface 14A of the ferrule 10 is used as a reference surface for positioning the ferrule 10.

The contact part 28 is a section that comes into contact with the protrusion 161. The contact part 28 is provided to a lower part of the housing 20. In one or more embodiments, the contact part 28 is formed in a columnar shape along the width direction, but it may be shaped like a pin.

FIGS. 10A to 10C are explanatory diagrams illustrating how the connector is connected in one or more embodiments.

As described above, the ferrule 10 is housed in the housing 20 while being pressed frontward in a recedable manner. At the stage before connecting the connector, as illustrated in FIG. 10A, the ferrule 10 is in a position where the collar part 15 is in contact with the projection 22 of the housing 20. At the position where the collar part 15 is in contact with the projection 22 of the housing 20, the protrusion 161 of the ferrule 10 is located frontward of the contact part 28 of the housing 20.

Further, as described above, when the operator inserts the optical connector 1 into the adapter 90, the inclined end face 13 of the ferrule 10 comes into contact with the inclined end face of the ferrule of the counterpart connector, as illustrated in FIG. 10B. At this time, the ferrule 10 receives force from the ferrule of the counterpart connector, and recedes with respect to the housing 20 against the elastic force of the spring 60 (see FIG. 2).

When the ferrule 10 recedes as illustrated in FIG. 10B, the protrusion 161 of the ferrule 10 comes into contact with the contact part 28 of the housing 20. As the ferrule 10 recedes further, the protrusion 161 of the ferrule 10 moves onto the contact part 28, and as a result, an upward force is applied to the ferrule 10.

In one or more embodiments, an upward force is applied to the ferrule 10 after the inclined end face 13 of the ferrule 10 has come into contact with the inclined end face of the ferrule of the counterpart connector. Thus, even if the ferrule 10 has not been displaced vertically by the previously anticipated amount because of friction force acting on the inclined end face 13 of the ferrule 10, the application of an upward force to the ferrule 10 can displace the ferrule 10 upward by the previously anticipated amount against the friction force acting on the inclined end face 13.

When the optical connector 1 is connected to the counterpart connector, as illustrated in FIG. 10C, the protrusion 161 of the ferrule 10 is located rearward of the contact part 28 of the housing 20. Stated differently, at the time of connecting the connector, when the ferrule 10 recedes with respect to the housing 20, the protrusion 161 of the ferrule 10 moves over the contact part 28 of the housing 20. When the protrusion 161 of the ferrule 10 moves over the contact part 28 of the housing 20, the upward force applied to the ferrule 10 is released. In this way, in one or more embodiments, after an upward force is once applied to the ferrule 10 at the time of connecting the connectors, the force applied to the ferrule 10 is released. If the upward force applied to the ferrule 10 is not released and the application part 80 (the protrusion 161 and the contact part 28) keeps applying the upward force to the ferrule 10, the guide pins 111 will cause abrasion to the inner wall surface of the guide pin holes 11, and thus, the durability of the optical connector 1 is prone to deteriorate. In contrast, in one or more embodiments, by releasing the force applied to the ferrule 10, abrasion of the guide pin holes 11 can be suppressed, and thus, the durability of the optical connector 1 is improved.

The protrusion 161 according to one or more embodiments is provided below the body part 14 of the ferrule 10. Thus, the contact part 28 can apply an upward force to the body part 14 of the ferrule 10 by contacting the protrusion 161 on the body part 14 of the ferrule 10, and can thus apply force to a section close to the inclined end face 13. This is advantageous because the end face of the optical fibers 3 can be displaced upward by the previously anticipated amount. Note, however, that the arrangement of the protrusion 161 is not limited to the above.

Figure 11A:
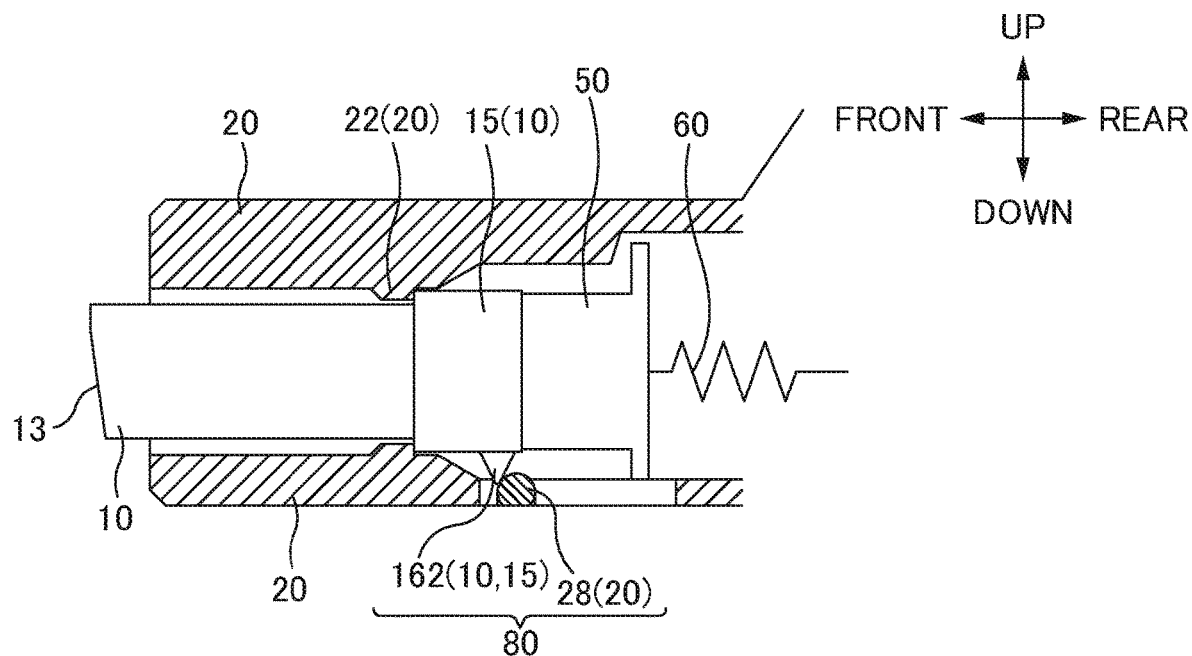
FIG. 11A is an explanatory diagram of a second modified example of one or more embodiments.

FIG. 11A is an explanatory diagram of a second modified example of the embodiments described above. In the second modified example, the protrusion 162 is provided to the collar part 15 of the ferrule 10. According to the second modified example, the contact part 28 can apply an upward force to the ferrule 10 by contacting the protrusion 162 on the collar part 15 of the ferrule 10. The second modified example is also advantageous, because the end face of the optical fibers 3 can be displaced upward, compared to cases where no upward force is applied to the ferrule 10.

Figure 11B:
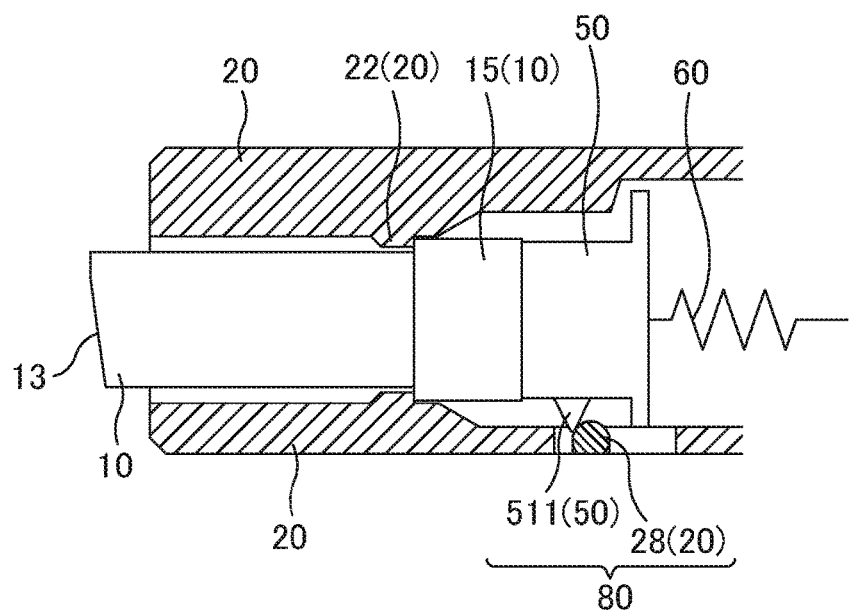
FIG. 11B is an explanatory diagram of a third modified example of one or more embodiments.

FIG. 11B is an explanatory diagram of a third modified example of the embodiments described above. In the third modified example, the protrusion 511 is provided to a member (pin clamp 50) arranged on the rear side of the ferrule 10. According to the third modified example, the contact part 28 can apply an upward force to the ferrule 10 via the pin clamp 50 by contacting the protrusion 511 on the pin clamp 50. The third modified example is also advantageous, because the end face of the optical fibers 3 can be displaced upward, compared to cases where no upward force is applied to the ferrule 10.

In the embodiments described above, the application part 80 applies an upward force to the ferrule 10 in conjunction with the movement of the ferrule 10. The movement amount of the ferrule 10 when connecting the connector is about 0.7 mm, which is smaller than the movement amount of the coupling 30 (about 1.5 mm) when connecting the connector. However, by configuring the protrusion and the contact part 28 so that the protrusion can move onto (or move over) the contact part 28 at the time of movement of the ferrule 10, an upward force can be applied to the ferrule 10.

Figure 12A:
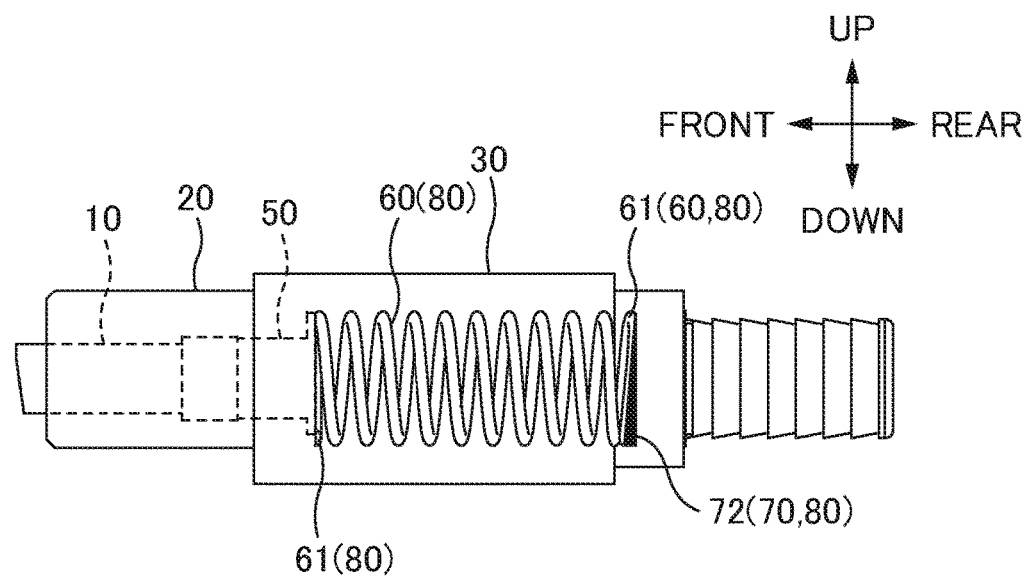
FIGS. 12A and 12B are explanatory diagrams according to one or more embodiments.
Figure 12B:
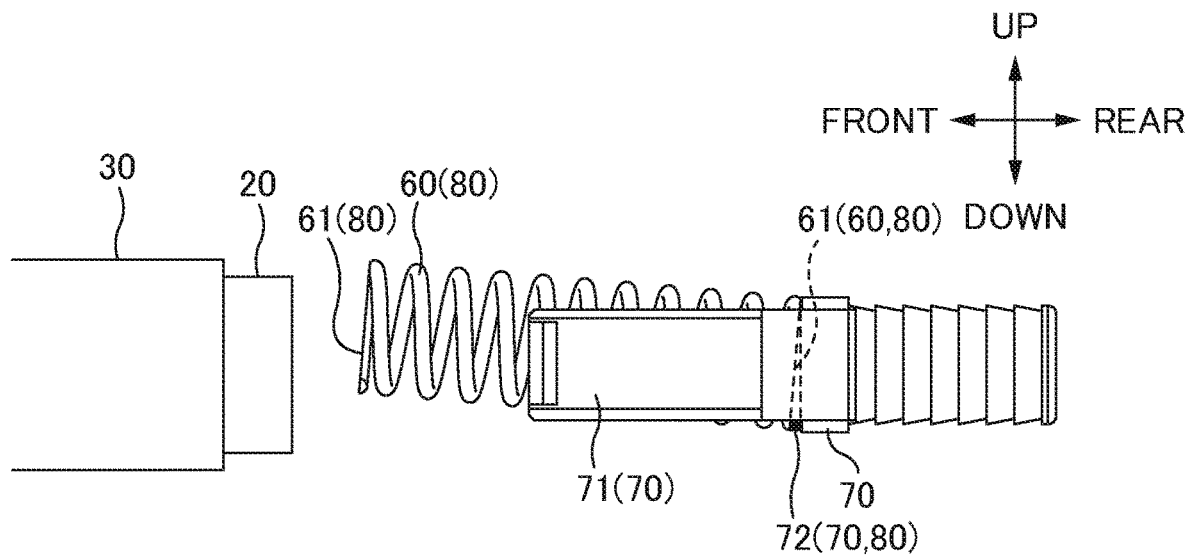

FIGS. 12A and 12B are explanatory diagrams according to one or more embodiments. An optical connector 1 (MPO connector) according to one or more embodiments includes a ferrule 10 and a housing 20. The optical connector 1 according to one or more embodiments also includes a coupling 30 outside the housing 20, and a floating mechanism 40 (a pin clamp 50, a spring 60, and a spring push member 70) housed inside the housing 20.

Both ends of the spring 60 are each provided with a seat part 61. The seat part 61 is a section provided to each end of the spring 60, and is a section constituting a seat of the spring 60. In a natural state of the spring 60 (i.e., in a state neither expanded nor contracted), the seat part 61 has a plane that is perpendicular to the axial direction (expansion/contraction direction) of the spring 60.

In one or more embodiments, the spring push member 70 has an inclined part 72. The inclined part 72 is a section that inclines the seat part 61 at the rear end of the spring 60, and is arranged between the pair of arms 71 (see FIG. 2). The normal vector of the inclined surface of the inclined part 72 (i.e., the surface that contacts the seat part 61) not only includes a frontward component but also an upward component. Thus, when the seat part 61 at the rear end of the spring 60 butts against the inclined part 72, the seat part 61 at the rear end of the spring 60 does not stay perpendicular to the front/rear direction, but inclines with respect to a plane that is parallel to the up/down direction and the left/right direction. Thus, in a natural state, when the seat part 61 at the rear end of the spring 60 is butted against the inclined part 72, the seat part 61 at the front end of the spring 60 will be located more toward the upper side, as illustrated in FIG. 12B, than when the spring is housed in the connector.

In order to house the spring 60 illustrated in FIG. 12B into the housing 20, the seat part 61 at the front end of the spring 60 illustrated in FIG. 12B is displaced rearward and also displaced downward. The spring 60 housed inside the housing 20 is compressed and deformed in the front/rear direction, and the seat part 61 at the rear end of the spring 60 is not perpendicular to the spring 60's axial direction (herein, the front/rear direction), but is inclined with respect to a plane perpendicular to the spring 60's axial direction (i.e., a plane that is parallel to the up/down direction and the left/right direction). The spring 60 (i.e., the spring 60 illustrated in FIG. 12A) housed inside the housing 20 in this way will press the ferrule 10 frontward and also apply an upward force thereto via the pin clamp 50.

Also in one or more embodiments, the application part 80 (spring 60) can apply an upward force to the ferrule 10, and thus, it is easy to displace the ferrule 10 upward by the previously anticipated amount.

Figure 13A:
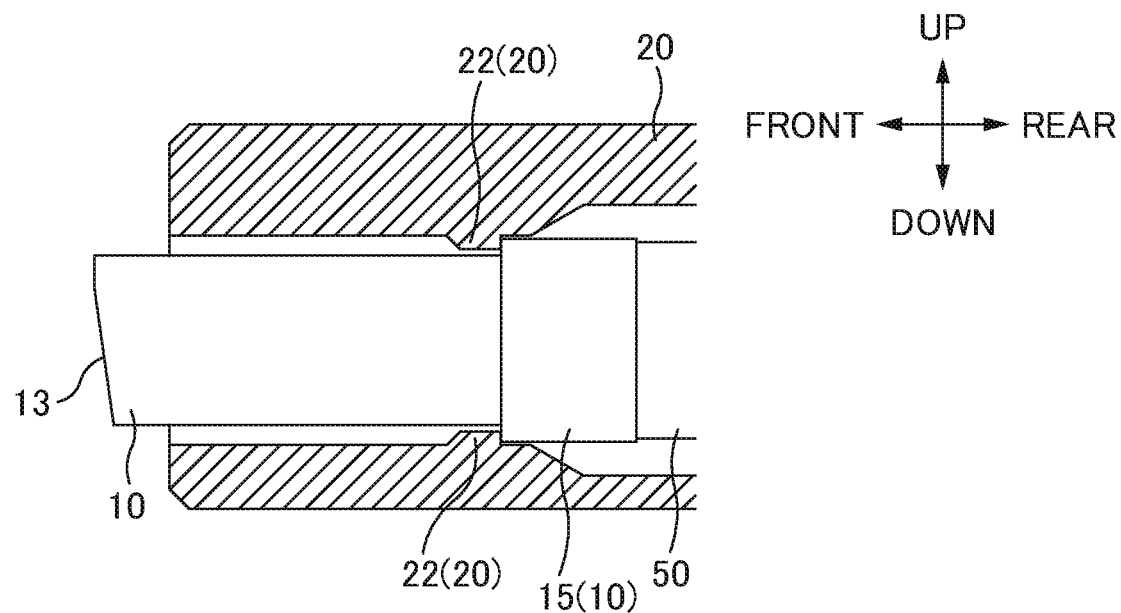
FIGS. 13A and 13B are explanatory diagrams according to one or more embodiments.
Figure 13B:
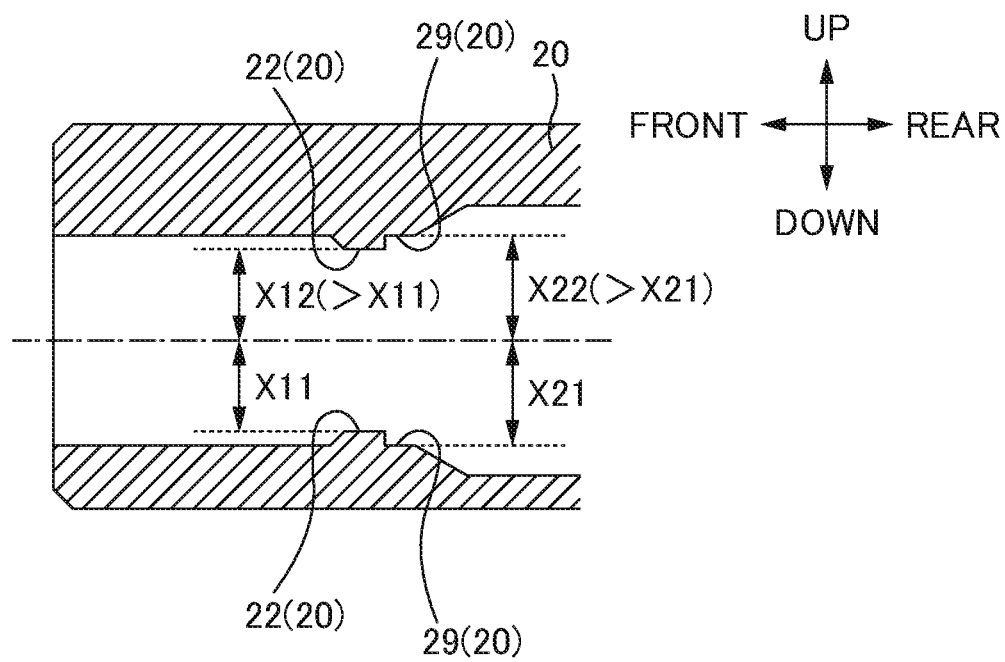

FIGS. 13A and 13B are explanatory diagrams according to one or more embodiments. The housing 20 according to one or more embodiments is usable as the housing 20 described in the embodiments described above.

The dot-and-dash line illustrated in FIG. 13B indicates the center position of a housing part (a housing part that houses the floating mechanism 40) in the rear section of the housing 20. In the figure, X11 is the distance, in the up/down direction, between the dot-and-dash line and the projection 22 (the upper surface of the projection 22) on the lower-side inner wall surface of the housing 20. X12 is the distance, in the up/down direction, between the dot-and-dash line and the projection 22 (the lower surface of the projection 22) on the upper-side inner wall surface of the housing 20. An ordinary housing 20 is designed such that X11 and X12 have the same length and are not different. Stated differently, in an ordinary housing 20, the center position between the upper and lower projections 22 matches the position of the dot-and-dash line. In contrast, according to one or more embodiments, X12 is longer than X11. Stated differently, in one or more embodiments, the projections 22 are designed such that the center position between the upper and lower projections 22 is above the position of the dot-and-dash line. With this configuration, when the ferrule 10 is housed in the housing 20 as illustrated in FIG. 13A, the ferrule 10 can be easily displaced upward from an ordinary state. Thus, when the aforementioned application part 80 applies an upward force to the ferrule 10, it is easy to displace the ferrule 10 upward by the previously anticipated amount.

Further, as illustrated in FIG. 13A, a collar housing part 29 for housing the front edge of the ferrule 10's collar part 15 is formed in the rear of the housing 20's projections 22. In the figure, X21 is the distance, in the up/down direction, between the dot-and-dash line and the lower-side inner wall surface of the collar housing part 29. X22 is the distance, in the up/down direction, between the dot-and-dash line and the upper-side inner wall surface of the collar housing part 29. An ordinary housing 20 is designed such that X21 and X22 have the same length and are not different. Stated differently, in an ordinary housing 20, the center position between the upper and lower inner wall surfaces of the collar housing part 29 matches the position of the dot-and-dash line. In contrast, according to one or more embodiments, X22 is longer than X21. Stated differently, in one or more embodiments, the collar housing part 29 is designed such that the center position between the upper and lower inner wall surfaces of the collar housing part 29 is above the position of the dot-and-dash line. With this configuration, when the ferrule 10 is housed in the housing 20 as illustrated in FIG. 13A, the ferrule 10 can be easily displaced upward from an ordinary state. Thus, when the aforementioned application part 80 applies an upward force to the ferrule 10, it is easy to displace the ferrule 10 upward by the previously anticipated amount.

According to the embodiments described above, the application part 80 of the optical connector 1 applies an upward force to the ferrule 10 when connecting the optical connector with a counterpart connector. Note, however, that an operator may apply an upward force to the ferrule 10 with his/her fingertip when connecting the optical connector with a counterpart connector. Even with this optical connector connection method, an upward force can be applied to the ferrule 10, and thus, the ferrule 10 can be displaced upward by the previously anticipated amount. However, a configuration wherein the optical connector 1 includes an application part 80 and the application part applies an upward force to the ferrule 10 upon connection with a counterpart connector can achieve low loss stably, because force can be applied reliably to a predetermined location in a stable manner, compared to cases where force is applied by an operator.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical connector;
10: Ferrule;
11: Guide pin hole;
111: Guide pin;
12: Fiber hole;
13: Inclined end face;
14: Body part;
14A: Lower surface;
14B: Depression;
15: Collar part;
161, 162: Protrusion;
20: Housing;
21: Key;
22: Projection;
23: Engagement part;
24: Window;
25: Guide face;
26: Pressing hole;
27: Pressing member;
27A: Pressing part;
27B: Fixing part;
28: Contact part;
29: Collar housing part
30: Coupling;
31: Front end surface;
32: Pressing part;
321: Slide part;
33: Joining part;
34: Release part;
35: Front edge;
36: Pulling member;
40: Floating mechanism;
50: Pin clamp;
51: Flange part;
511: Protrusion;
60: Spring;
61: Seat part;
70: Spring push member;
71: Arm;
711: Lug;
72: Inclined part;
80: Application part;
90: Adapter;
91: Claw.

The invention claimed is:

1. An optical connector comprising:
 a ferrule comprising:
  a guide pin hole;
  a plurality of fiber holes lined up in a width direction of the optical connector; and
  an inclined end face;
 a housing in which the ferrule is retractably housed; and
 an application part that applies an upward force to the ferrule in an upward/downward direction when the optical connector connects with a counterpart connector in a connecting/disconnecting direction, wherein
  the upward/downward direction is a height direction of the optical connector and is orthogonal to both the connecting/disconnecting direction and the width direction, and
  the inclined end face projects upward toward the counterpart connector.

2. The optical connector according to claim 1, wherein the application part applies the upward force to the ferrule after fitting together a guide pin and a guide pin hole when the optical connector connects with the counterpart connector.

3. The optical connector according to claim 2, wherein the application part applies the upward force to the ferrule before the inclined end face of the ferrule contacts an inclined end face of a ferrule of the counterpart connector.

4. The optical connector according to claim 1, wherein the application part releases the upward force applied to the ferrule after applying the upward force to the ferrule.

5. The optical connector according to claim 4, wherein the application part releases the upward force applied to the ferrule after the inclined end face of the ferrule contacts an inclined end face of a ferrule of the counterpart connector.

6. The optical connector according to claim 1, wherein the application part applies the upward force to the ferrule by pressing a body part of the ferrule.

7. The optical connector according to claim 1, wherein the application part applies the upward force to the ferrule by pressing a collar part of the ferrule.

8. The optical connector according to claim 1, wherein the application part applies the upward force to the ferrule by applying force to a rear side of the ferrule.

9. The optical connector according to claim 1, further comprising:
 a coupling mounted to the housing, wherein
  the application part applies the upward force to the ferrule in conjunction with movement of the coupling with respect to the housing.

10. The optical connector according to claim 9, wherein the application part comprises a pressing part provided to the coupling, and
 when the coupling retracts into the housing, the pressing part presses the ferrule upward by moving upward while retracting along a guide face provided to the housing.

11. The optical connector according to claim 9, wherein the application part comprises a pressing part provided to the housing, and
 when the coupling retracts into the housing, the pressing part presses the ferrule upward by receiving force from the coupling.

12. The optical connector according to claim 10, wherein the pressing part is disposed on an opposite side from a side of the housing where a key is provided.

13. The optical connector according to claim 1, wherein the application part applies the upward force to the ferrule in conjunction with movement of the ferrule with respect to the housing.

14. The optical connector according to claim 13, wherein the application part comprises:
 a protrusion that moves together with the ferrule; and
 a contact part provided to the housing, and when the ferrule retracts into the housing, the ferrule receives the upward force from the protrusion due to the protrusion that contacts the contact part.

15. The optical connector according to claim 14, wherein, when the ferrule retracts into the housing, the upward force to the ferrule is released while the protrusion moves over the contact part.

16. The optical connector according to claim 14, wherein a depression is formed in a lower surface of the ferrule, and
the protrusion is disposed in the depression and does not protrude below the lower surface of the ferrule.

17. The optical connector according to claim 1, wherein
the application part is a spring that presses the ferrule frontward in the connecting/disconnecting direction with respect to the housing, and
a seat part at a rear end of the spring is inclined with respect to a plane perpendicular to an axial direction of the spring.

18. A method for connecting an optical connector that includes comprises:
a ferrule and a housing in which the ferrule is retractably housed, wherein the ferrule comprises a guide pin hole;
a plurality of fiber holes lined up in a width direction of the optical connector; and an inclined end face, the method comprising:
applying an upward force to the ferrule in an upward/downward direction when the optical connector connects with a counterpart connector in a connecting/disconnection direction, wherein
the upward/downward direction is a height direction of the optical connector and is orthogonal to both the connecting/disconnecting direction and the width direction, and
the inclined end face projects upward toward the counterpart connector.

* * * * *